US007251675B1

(12) United States Patent
Kamakura et al.

(10) Patent No.: US 7,251,675 B1
(45) Date of Patent: Jul. 31, 2007

(54) MEETING SYSTEM AND INFORMATION STORAGE MEDIUM

(75) Inventors: Hiroshi Kamakura, Okaya (JP); Fumio Nagasaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/743,112

(22) PCT Filed: May 1, 2000

(86) PCT No.: PCT/JP00/02896

§ 371 (c)(1),
(2), (4) Date: Jan. 16, 2001

(87) PCT Pub. No.: WO00/68808

PCT Pub. Date: Nov. 16, 2000

(30) Foreign Application Priority Data

May 7, 1999 (JP) ................................. 11/126857

(51) Int. Cl.
*G06F 15/16* (2006.01)
*G06F 15/167* (2006.01)
(52) U.S. Cl. .................. 709/204; 709/205; 709/213; 709/231
(58) Field of Classification Search ........ 709/204–205, 709/213, 231
See application file for complete search history.

(56) References Cited

U.S. PATENT DOCUMENTS 5,206,934 A * 4/1993 Naef, III .................... 709/204
5,363,507 A * 11/1994 Nakayama et al. ......... 715/743
5,551,015 A * 8/1996 Goettelmann et al. ...... 717/137

(Continued)

FOREIGN PATENT DOCUMENTS

EP 0 847 178 A2 6/1998

(Continued)

OTHER PUBLICATIONS

Takuhiro Kimura et al., "A design of multimedia collaboration system for 'seminar-type' collaborative learning", Search report of Information Processing Society of Japan (IPSJ), vol. 97, No. 125, Dec. 19, 1997, pp. 39-46.

(Continued)

*Primary Examiner*—Rupal Dharia
*Assistant Examiner*—Kristie Shingles
(74) *Attorney, Agent, or Firm*—Oliff & Berridge PLC

(57) ABSTRACT

In a meeting system, supplied-data which is convertible using a virtual machine is transmitted and received among a plurality of processing apparatuses interconnected via a transmission line, and meeting data is reproduced. At least two of the plurality of processing apparatuses include a meeting data reproducing apparatus respectively. At least one meeting data reproducing apparatus includes converting means including a virtual machine for converting the supplied-data into a data format which allows the meeting data to be reproduced, a communication interface unit for receiving the supplied-data from other processing apparatuses, and storage means in which a generated image is stored and which is accessible by other processing apparatuses via the communication interface unit. Each of at least one meeting data reproducing apparatus described above and another meeting data reproducing apparatus including the converting means and the communication interface unit reads part of the meeting data from the storage means and reproduces meeting data in a task-distributed fashion.

22 Claims, 16 Drawing Sheets

U.S. PATENT DOCUMENTS

| | | | |
|---|---|---|---|
| 5,559,875 A * | 9/1996 | Bieselin et al. | 379/202.01 |
| 5,572,728 A * | 11/1996 | Tada et al. | 707/200 |
| 5,668,863 A * | 9/1997 | Bieselin et al. | 379/202.01 |
| 5,799,191 A * | 8/1998 | Moriyasu et al. | 709/204 |
| 5,818,436 A * | 10/1998 | Imai et al. | 715/500.1 |
| 5,894,306 A * | 4/1999 | Ichimura | 345/418 |
| 5,907,324 A * | 5/1999 | Larson et al. | 715/753 |
| 5,917,480 A * | 6/1999 | Tafoya et al. | 345/732 |
| 5,983,263 A * | 11/1999 | Rothrock et al. | 709/204 |
| 5,986,655 A * | 11/1999 | Chiu et al. | 715/839 |
| 5,987,256 A * | 11/1999 | Wu et al. | 717/146 |
| 5,995,096 A * | 11/1999 | Kitahara et al. | 715/753 |
| 5,996,002 A * | 11/1999 | Katsurabayashi et al. | 709/204 |
| 5,996,003 A * | 11/1999 | Namikata et al. | 709/205 |
| 6,119,147 A * | 9/2000 | Toomey et al. | 709/204 |
| 6,151,621 A * | 11/2000 | Colyer et al. | 709/204 |
| 6,192,395 B1 * | 2/2001 | Lerner et al. | 709/204 |
| 6,304,283 B1 * | 10/2001 | Kitagawa | 348/14.06 |
| 6,343,313 B1 * | 1/2002 | Salesky et al. | 709/204 |
| 6,438,604 B1 * | 8/2002 | Kuver et al. | 709/234 |
| 6,512,507 B1 * | 1/2003 | Furihata et al. | 345/157 |
| 6,529,920 B1 * | 3/2003 | Arons et al. | 715/500.1 |
| 6,608,636 B1 * | 8/2003 | Roseman | 715/753 |
| 6,789,252 B1 * | 9/2004 | Burke et al. | 717/100 |
| 6,862,735 B1 * | 3/2005 | Slaughter et al. | 719/315 |
| 7,007,235 B1 * | 2/2006 | Hussein et al. | 715/751 |

FOREIGN PATENT DOCUMENTS

| | | |
|---|---|---|
| GB | 2 324 175 A | 10/1998 |
| JP | A 4-037922 | 2/1992 |
| JP | A 6-4498 | 1/1994 |
| JP | A-6-4498 | 1/1994 |
| JP | A 7-181935 | 7/1995 |
| JP | A 10-285235 | 10/1998 |
| WO | WO 99/06910 | 2/1999 |

OTHER PUBLICATIONS

Yuko Ikehata et al., "An integrated collaboration system that has greater flexibility in World Wide Web by using Java: Universal Canvas", Search Report of Information Processing Society of Japan (IPSJ), vol. 97, No. 23, Mar. 6, 1997, pp. 43-48.

Bodendorf et al., "Telelearning in the virtual lecture theatre," Displays, Elsevier Science Publishers BV., vol. 17, No. 3-4, May 1, 1997, pp. 147-151.

Franze et al., "An Infrastructure for Collaborative Teleteaching," Enabling Technologies: Infrastructure for Collaborative Enterprises, 1997, Proceedings., Sixth IEEE Workshops on Cambridge, MA, USA 18-20, Jun. 18, 1997, pp. 341-346.

Sun Microsystems: "Jini™ Technology and Emerging Network Technologies," Sun Microsystems, Jan. 18, 1999, the whole document.

"Sun Microsystems Jini™ Architectural Overview," Sun Microsystems ICG White Paper, XX, XX, Jan. 1999, pp. 1-27.

* cited by examiner

FIG. 10

| ID | SERVICE TO BE PROVIDED | STATUS |
|---|---|---|
| ...005 | COMMAND | ENABLED |
| ...004 | READ 2- OR 3-DIMENSIONAL DATA | IN PROGRESS |
| ...001 | PROJECTION | IN PROGRESS |
| ...002 | COMMAND, CALCULATION, DISPLAY | DISABLED |
| ...003 | PRINT | WAITING FOR EXECUTION |
| ... | ... | ... |

912

FIG. 11
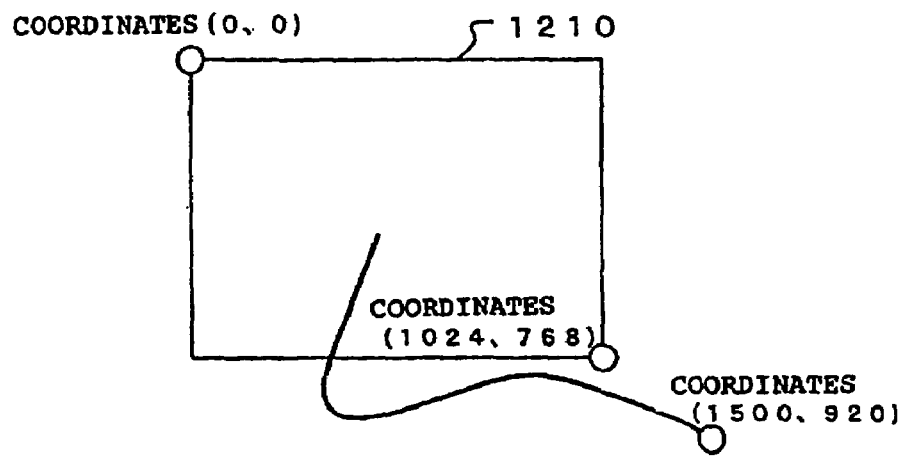
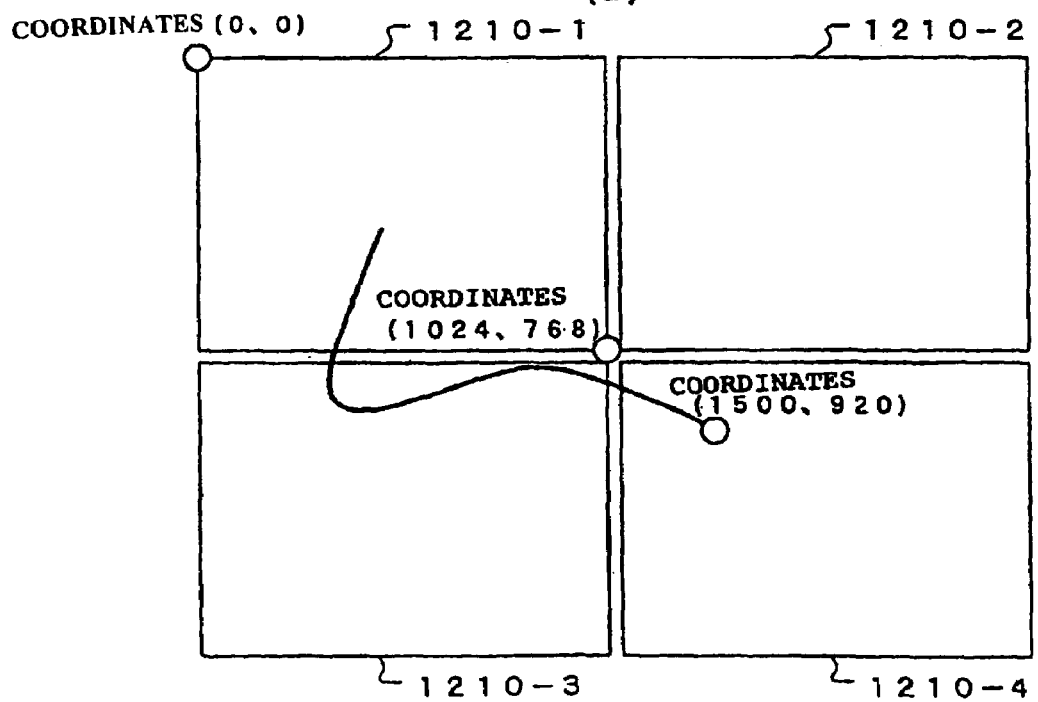

FIG. 13
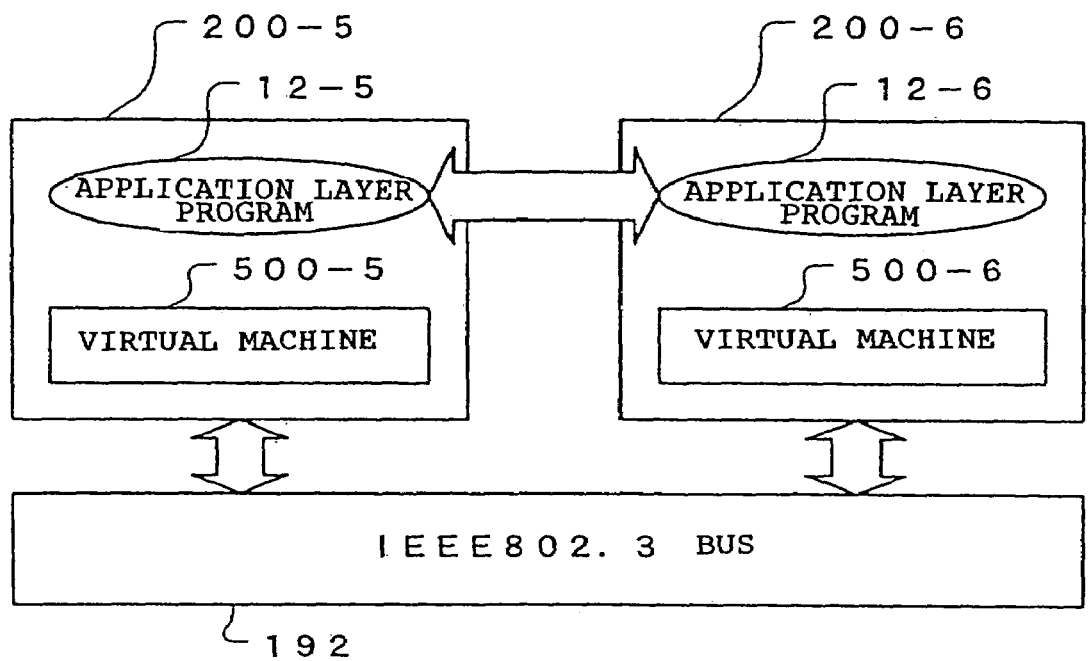
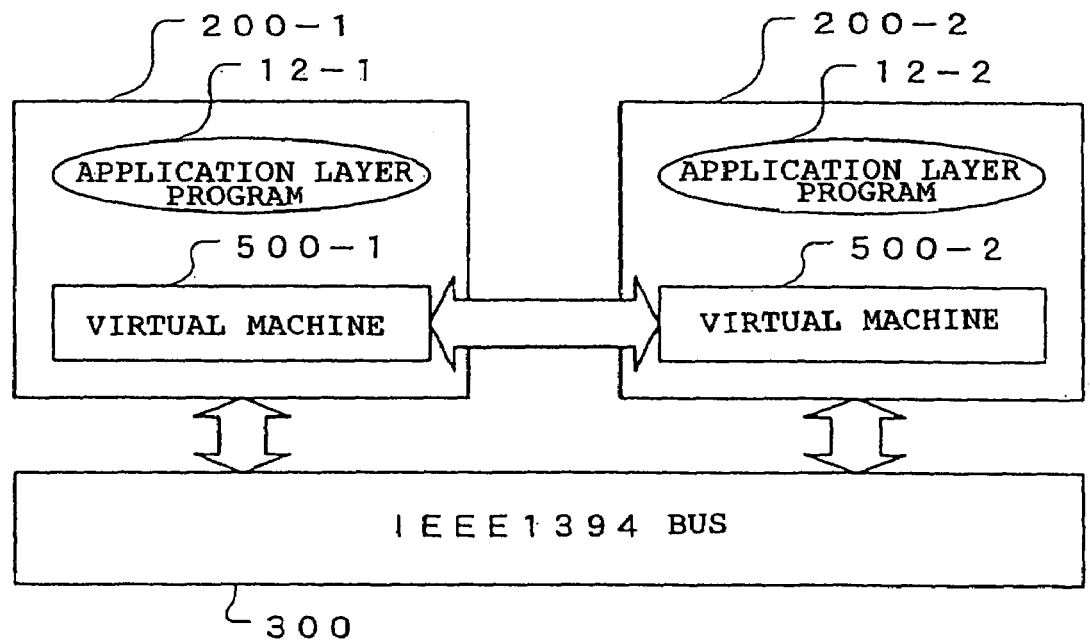

FIG. 15
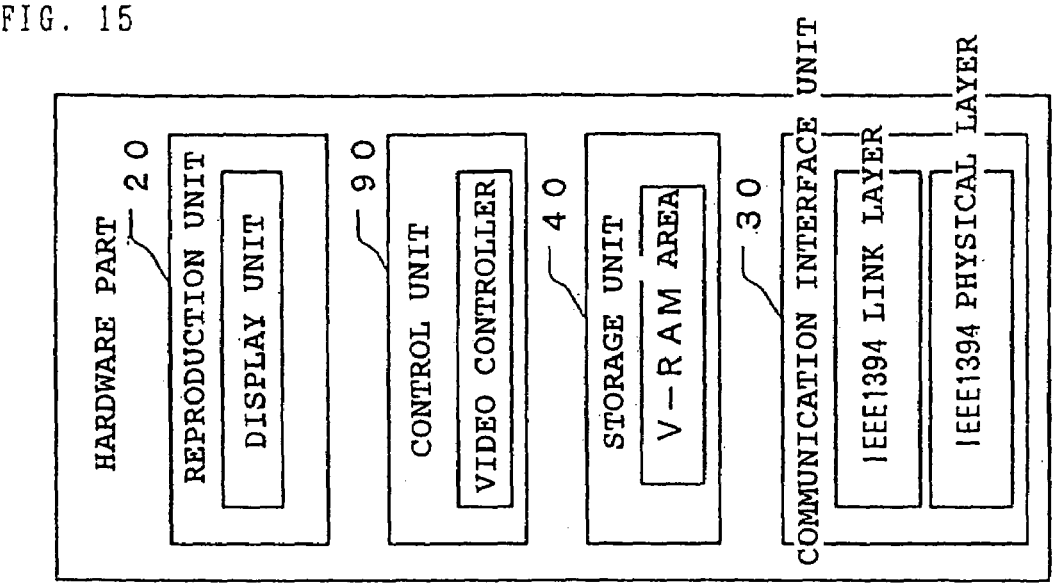
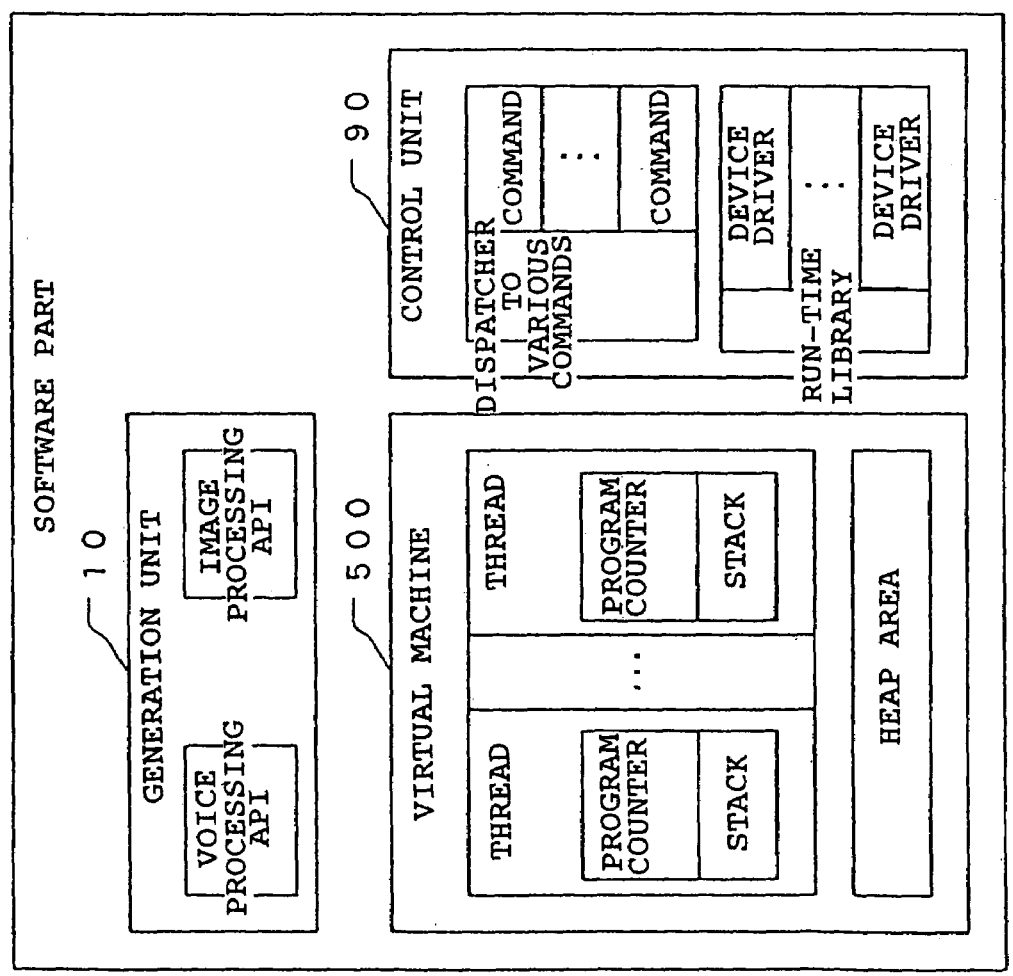

MEETING SYSTEM AND INFORMATION STORAGE MEDIUM

BACKGROUND OF THE INVENTION

1. Field of the Invention

The present invention relates to a meeting system and an information storage medium for use in a meeting.

2. Description of Related Art

Meeting systems for use in meetings include various devices which are interconnected.

In some cases, a single projector is connected to a plurality of PCs (personal computers) or the like which are different from one another in manufacturers and/or OSs (operating systems).

SUMMARY OF THE INVENTION

It is desirable that devices be connected as freely as possible to one another without concern for the types of PCs to be connected, the types of OSs, or other factors. That is, it is desired to improve the interconnectivity among devices.

When a meeting is performed using a conventional meeting system, a presenter makes a presentation using a personal computer and a projector to an audience at a single meeting place.

However, in some practical cases, it is desired to perform presentations not only in such a one-way manner but also in a two-way manner in which a plurality of persons are allowed to write on a presentation screen and playing back of a written screen is possible, thereby allowing two-way communication between a person who provides a presentation and persons who receive the presentation.

One possible playing-back technique is to take a meeting picture using a video recorder and play it back. However, in order to play back a particular scene of a meeting or a particular part such as a particular chapter of a presentation, it is required to perform a rewinding or fast-forward operation which takes a long time.

In the case where only presentation data, which has been generated using application software, is played back, it is rather easy to play back a particular specified part. However, in this case, it is impossible to play back an actual scene of a presentation. For example, it is impossible to reproduce the movement of a pointing stick.

In some cases, a presentation is made not only at a single place but also at a plurality of places which are interconnected, wherein the meeting places may be remote from one another as is the case where a meeting is held in the USA and Japan.

In many cases, data such as moving image data used in presentations is large in size. Therefore, when data is transmitted among different places during a presentation, it is required that the data be transmitted at a high speed.

For processing such as drawing process which takes a long time, the processing speed can be improved by distributing the processing load in such manner that a drawing command is sent from a projector serving as a terminal to a host device, the host device performs the drawing process, and the projector displays the drawing result.

In view of the above, it is a first object of the present invention to provide a meeting system capable of improving interconnectivity of apparatus.

It is a second object of the present invention to provide a meeting system capable of immediately playing back a past meeting scene in response to a command.

It is a third object of the present invention to provide a meeting system capable of generating meeting data by means of distributed processing.

In order to achieve the above objects, the present invention provides a meeting system in which supplied-data which is convertible using a virtual machine is transmitted and received among a plurality of processing apparatuses which are interconnected via a transmission line and meeting data is reproduced, wherein at least two of the plurality of processing apparatuses include a meeting data reproducing apparatus respectively, at least one meeting data reproducing apparatus includes:

converting means (conversion unit) including a virtual machine for converting the supplied-data into a data format which allows the meeting data to be reproduced;

a communication interface unit for receiving the supplied-data from another processing apparatus; and storage means (storage unit) in which a generated image is stored and which is accessible by the another processing apparatus via the communication interface unit, and each of the at least one meeting data reproducing apparatus and another meeting data reproducing apparatus including the converting means and the communication interface unit reads a part of the meeting data from the storage means and reproduces meeting data in a task-distributed fashion.

In this meeting system according to the present invention, the storage area is shared so that meeting data can be reproduced by a plurality of meeting data reproducing apparatuses in a task-distributed fashion. This reduces the loads upon the respective meeting data reproducing apparatuses and allows an image to be displayed at a high speed.

Furthermore, when a plurality of meeting data reproducing apparatuses draw different drawing areas, the sharing of the same storage area makes it possible to perform drawing while recognizing which apparatus is drawing which drawing area. Thus, this technique is effective in particular in distributed processing.

Herein, it is desirable that the transmission line described above be a high-speed transmission line. The use of the high-speed transmission lines allows the respective processing apparatuses to access a storage area of other processing apparatus as if the access were made to their own storage area.

Specific examples of such a high-speed transmission line include an IEEE-1394 bus and an optical fiber channel.

The use of the virtual machine makes it easy to transmit and receive data among the processing apparatuses. Herein, the virtual machine refers to means for reading files in a common format and performing operations specified in the files. A specific example of the virtual machine is a JAVA virtual machine. JAVA is a trademark of Sun Microsystems, Inc. of the USA.

The present invention also provides another meeting system in which supplied-data convertible using a virtual machine is transmitted and received among a plurality of processing apparatuses which are interconnected via a transmission line and meeting data is generated, wherein at least two of the plurality of processing apparatuses include a meeting data generating apparatus respectively, at least one meeting data generating apparatus includes:

converting means including a virtual machine for converting the supplied-data into a data format which allows the meeting data to be generated;

a communication interface unit for receiving the supplied-data, which is convertible by the converting means, from the other processing apparatus; and storage means for storing generated meeting data, which is accessible by the other processing apparatus via the communication interface unit, and each of the at least one meeting data generating apparatus and the other meeting data generating apparatus including the converting means and the communication interface unit accesses the storage means and generates meeting data in a task-distributed fashion.

In this meeting system according to the present invention, a storage area is shared and image processing is performed by a plurality of meeting data generating apparatuses in a task-distributed fashion. This reduces the loads upon the respective meeting data generating apparatus and makes it possible to generate an image at a high speed.

More specifically, generation of meeting data which needs a large amount of processing is performed by a meeting data generating apparatus having a high processing capacity, and generation of an image which needs a small amount of processing is performed by a meeting data generating apparatus having a low processing capacity, thereby distributing the load of the image processing.

Furthermore, when a plurality of meeting data reproducing apparatus generate different drawing areas, the sharing of the same storage area makes it possible to generate an image while recognizing which apparatus is generating which drawing area. Thus, this technique is effective in particular for distributed processing.

Herein, it is desirable that the transmission line described above be a high-speed transmission line. The use of the high-speed transmission line allows the respective processing apparatus to access a storage area of other processing apparatus as if the access were made to their own storage area.

Specific examples of such a high-speed transmission line include an IEEE-1394 bus and an optical fiber channel.

The use of the virtual machine makes it easy to transmit and receive data among the processing apparatus. Herein, the virtual machine refers to means for reading files in a common format and performing operations specified by the files. A specific example of the virtual machine is a JAVA virtual machine.

The present invention also provides still another meeting system in which supplied-data convertible using a virtual machine is transmitted and received among a plurality of processing apparatuses which are interconnected via a transmission line and meeting data is generated and reproduced, wherein at least one of the plurality of processing apparatus includes a meeting data generating apparatus, at least one of the plurality of processing apparatus includes a meeting data reproducing apparatus, the meeting data reproducing apparatus includes:

converting means including a virtual machine for converting the supplied-data into a data format which allows the meeting data to be reproduced; and a communication interface unit for receiving the supplied-data convertible by the converting means from another processing apparatus;

the meeting data generating apparatus includes:

means for generating supplied-data (supplied-data generation unit), which is convertible by the converting means, in accordance with generated meeting data; and a communication interface unit for transmitting supplied-data including generated meeting data to the meeting data reproducing apparatus via the transmission line, at least one of the meeting data generating apparatus and the meeting data reproducing apparatus includes storage means for storing generated meeting data, which is accessible by the other processing apparatus via the communication interface unit, and the meeting data generating apparatus and the meeting data reproducing apparatus access the storage means and generate and reproduce meeting data.

In this meeting system according to the present invention, a storage area is shared and image processing is performed by a plurality of meeting data generating apparatus and a plurality of meeting data reproducing apparatuses in a task-distributed fashion. This reduces the load upon the respective processing apparatus and makes it possible to process an image at a high speed.

Herein, it is desirable that the transmission line described above be a high-speed transmission line. The use of the high-speed transmission line allows the respective processing apparatus to access a storage area of other processing apparatus as if the access were made to their own storage area.

Specific examples of such a high-speed transmission line include an IEEE-1394 bus and an optical fiber channel.

The use of the virtual machine makes it easy to transmit and receive data among the processing apparatus. Herein, the virtual machine refers to means for reading files in a common format and performing operations specified in the files. A specific example of the virtual machine is a JAVA virtual machine.

Preferably, the supplied-data includes at least one of image data for displaying the meeting data and control data for controlling the displaying of the meeting data, and the meeting data reproducing apparatus includes:

means for displaying the meeting data (display unit) in accordance with the image data; and means for controlling the displaying of the meeting data (control unit) in accordance with the control data.

This makes it possible to realize a meeting system in which various data can be transmitted and received among the processing apparatus. More specifically, for example, it becomes possible to draw an underline under displayed characters in response to control data.

The processing apparatus may include a server device, the supplied-data may include a component object serving as a part of a program for generating the meeting data, and the meeting data generating apparatus may generate the program for generating meeting data in accordance with the received component object and may generate the meeting data using the program.

This allows the meeting data generating apparatus to easily extend the functions of the program by receiving a component object.

A specific example of the component object is a JAVA applet.

Preferably, the meeting data generation apparatus comprises:

data control means (data control unit) for storing the supplied-data, converted by the converting means, in the storage unit which stores particular presentation data while it manages the converted supplied-data received from each of the processing apparatuses that supply the supplied-data and for reading meeting data that contains at least part of the supplied-data and the presentation data from the storage unit; and the communication interface unit includes means for transmitting to the meeting data reproducing apparatus the meeting data that has been read (transmitting unit).

This allows meeting participants to immediately play back desired past meeting data by issuing a command.

A specific example of the reproduction command is one that is issued by a meeting participant or a presenter using particular reproduction command issuing means.

Preferably, the meeting data reproducing apparatus reproduces the meeting data stored in the storage means in units of data associated with the processing apparatus which supplies the supplied-data, in accordance with the reproduction command.

This allows meeting participants to immediately play back past meeting data in units of data associated with the respective processing apparatus by issuing a command indicating that the meeting data should be played back in units of data associated with the respective processing apparatus.

More specifically, for example, when a plurality of meeting participants transmit input data using their own input devices, it is possible to play back the meeting data in units of data associated with the respective input devices, that is, in units of data input by the respective meeting participants.

Preferably, the meeting data generating apparatus includes:

image-recording means (image-recording unit) for recording images of a meeting scene, and means for storing image data obtained as a result of the image-recording of the meeting scene (image data storing unit) in the storage unit as a part of the meeting data, in predetermined units of data, and the meeting data reproducing apparatus reproduces the meeting data stored in the storage means, in predetermined units of data in accordance with the reproduction command.

Herein, specific examples of the meeting scene include an image which is pointed to by a presenter using a pointing stick, a laser pointer, or a finger, in front of a screen or on a tablet, and an image in which the pointing is reflected.

Because the image of the meeting scene includes not only presentation data to be reproduced but also images in which the pointing performed by meeting participants is reflected, it is possible to immediately reproduce the positions and the contents pointed to from the image data thereby allowing a better understanding of the situation of the meeting in which the presenter and participants make a discussion.

Furthermore, it is also preferable that the meeting data generating apparatus include voice recording means for recording the speeches in meetings and the data control means stores the recorded voice data in the storage means as a part of the meeting data.

Herein, specific examples of the speeches in meetings include speeches of a presenter and meeting participants. This makes it possible to reproduce voice data together with other data, and thus it becomes possible to better understand the meeting situation.

Herein, specific examples of the particular units of data are chapters, sections, and pages. For example, if a meeting participant issues a command to request reproduction of Section 2 in Chapter 3, the specified part of the data is immediately played back without delay.

Preferably, at least one of the meeting data generating apparatus and the meeting data reproducing apparatus includes a projector.

This makes it possible to realize a highly versatile projector having the above capabilities which can be extended as required. Furthermore, it is also possible to realize a projector having the meeting data generating apparatus and the meeting data reproducing apparatus.

It is preferable that the transmission line described above include an IEEE-1394 bus.

Because the IEEE-1394 bus is a high-speed bus, it becomes possible to transmit and receive data at a high speed among the processing apparatus. Furthermore, this makes it possible to easily share a storage area.

The use of the IEEE-1394 bus interface allows standardization of communication modes. For example, SBP-2 (Serial Bus Protocol-2) may be employed as a standard communication protocol. This enhances the reliability of transmission/reception of data.

Also, according to the present invention an information storage medium that is readable by a computer having storage means and that stores information for generating meeting data while a plurality of processing apparatuses interconnected via a transmission line transmit and receive, and perform distributed processing on, supplied-data in a common format interpretable by a virtual machine, wherein the information includes information for implementing a communication interface unit which allows the storage means to be shared by other processing apparatus.

The information storage medium according to the present invention makes it possible to provide storage medium which is accessible by the respective processing apparatuses. This storage technique is effective in particular for distributed processing.

Furthermore, the employment of the virtual machine and the common data format for supplied-data make it possible for the processing apparatus to communicate with another apparatus without concern about that apparatus.

Herein, the transmission line is preferably an IEEE-1394 bus, and the communication interface unit is preferably an IEEE-1394 bus interface.

This allows the respective processing apparatuses to access the shared storage means as if the access were performed to their own storage areas.

The present invention provides another information storage medium that is readable by a computer and that stores information for generating meeting data while a plurality of processing apparatuses interconnected via a transmission line transmit and receive, and perform distributed processing on, supplied-data in a common format interpretable by a virtual machine, wherein the information includes information for generating supplied-data in the common format; and information for transmitting the generated supplied-data to at least one of the processing apparatus having storage means accessible by the respective processing apparatus.

This technique according to the present invention allows supplied-data generated in a share mode (the common format) to be stored in the storage means in the common form thereby making it possible for the respective processing apparatuses to access the storage means to acquire the supplied-data. This technique is effective in particular in distributed processing.

In the case where a JAVA applet is employed as the supplied-data, a plurality of processing apparatuses can simultaneously download the JAVA applet stored in the storage means. This makes it possible to easily change the specifications or extend the functions.

Herein, it is preferable to employ an IEEE-1394 bus as the transmission line.

This allows the respective processing apparatuses to access the shared storage means as if the access were performed to their own storage areas.

The present invention provides yet another information storage medium that is readable by a computer and that stores information for reproducing meeting data while a plurality of processing apparatuses interconnected via a transmission line transmit and receive, and perform distributed processing on, supplied-data in a common format interpretable by a virtual machine, wherein the information includes:
reading information for accessing at least one of the processing apparatus having storage means which stores the meeting data and which is accessible by the respective processing apparatus to read the meeting data stored in the storage means; and
reproducing information for reproducing read image data, the reading information includes:
information for generating supplied-data indicating a reading request and for converting the supplied-data into the common format; and
information for transmitting the converted supplied-data to the processing apparatus having the storage means to receive supplied-data including meeting data from the processing apparatus,
the reproducing information includes:
information for implementing the virtual machine; and
information for converting supplied-data using the virtual machine in accordance with the received supplied-data so as to reproduce the meeting data.

Herein, the employment of the common format for supplied-data accommodates the differences in OS and manufacturer and makes it possible to receive and display image data regardless of the type of the apparatus which provides the image data.

The present invention also provides yet another information storage medium that is readable by a computer and that stores information for generating meeting data while a plurality of processing apparatuses interconnected via a transmission line transmit and receive, and perform distributed processing on, supplied-data in a common format interpretable by a virtual machine, wherein the information includes:
requesting information for requesting a particular service to another processing apparatus; and
providing information for providing a particular service to another processing apparatus,
the requesting information includes:
information for generating supplied-data indicating a request for the particular service and converting the supplied-data into the common format; and
information for transmitting the converted supplied-data to another processing apparatus,
the providing information includes:
information for implementing the virtual machine;
information for receiving supplied-data indicating a request for a service from another processing apparatus and converting the supplied-data using the virtual machine;
information for determining whether it is possible to provide the service in accordance with the converted supplied-data; and
information for, if it is possible to provide the service, providing the service.

This storage medium according to the present invention allows image processing to be performed by a plurality of processing apparatus in a task-distributed fashion while transmitting and receiving information to or from one another. For example, when a projector issues a request for a printing service, a printer available for providing the printing service responds to the request and provides the printing service.

Such distributed processing is achieved by facilitating the transmission and reception of data among the processing apparatus by employing the virtual machine and the common format for supplied-data.

The supplied-data preferably includes at least one of meeting data, an object for generating meeting data, an object for controlling the generation of meeting data, an object for reproducing meeting data, and an object for controlling the reproduction of meeting data.

Herein, because the data or objects are described in the same common format, high versatility is obtained in image processing by means of distributed processing.

It is preferable that the transmission line described above include an IEEE-1394 bus.

This allows the respective processing apparatuses to access the shared storage means as if the access were performed to their own storage areas. Furthermore, the respective processing apparatus are allowed to perform the above-described transmission and reception of information at a high speed, and thus the processing speed is increased.

BRIEF DESCRIPTION OF THE DRAWINGS

FIG. 10 is a schematic diagram illustrating an example of a management table.

FIGS. 11(A)-(B) are schematic diagrams illustrating examples of the manner in which an image is displayed by means of distributed processing, wherein FIG. 11(A) illustrates an example in which an image is displayed using only one liquid crystal projector and FIG. 11(B) illustrates an example in which an image is displayed using four liquid crystal projectors.

FIGS. 13(A)-(B) are schematic diagrams illustrating communication methods using virtual machines, wherein FIG.

13(A) illustrates a conventional communication method and FIG. 13(B) illustrates a communication method according to the present embodiment.

FIG. 15 is a functional block diagram illustrating a software part and a hardware part of a projector.

DETAILED DESCRIPTION OF PREFERRED EMBODIMENTS

Preferred embodiments of meeting systems are described below with reference to the accompanying drawings.

In a meeting system according to the present embodiments, a plurality of display devices and input devices are interconnected via communication lines or a system bus having bidirectional connectivity. More specifically, in an example of the meeting system, a certain meeting participant points to an image projected or displayed on a screen by a display device and another meeting participant adds information, using an input device, to an image displayed on the screen. In another example, a plurality of meeting systems, which may also be used singly, are disposed at remote places and they are connected synchronously to one another via communication lines so that participants at remote places can participate in a meeting.

(Description of the Configuration of the Meeting System)

Figure 1:
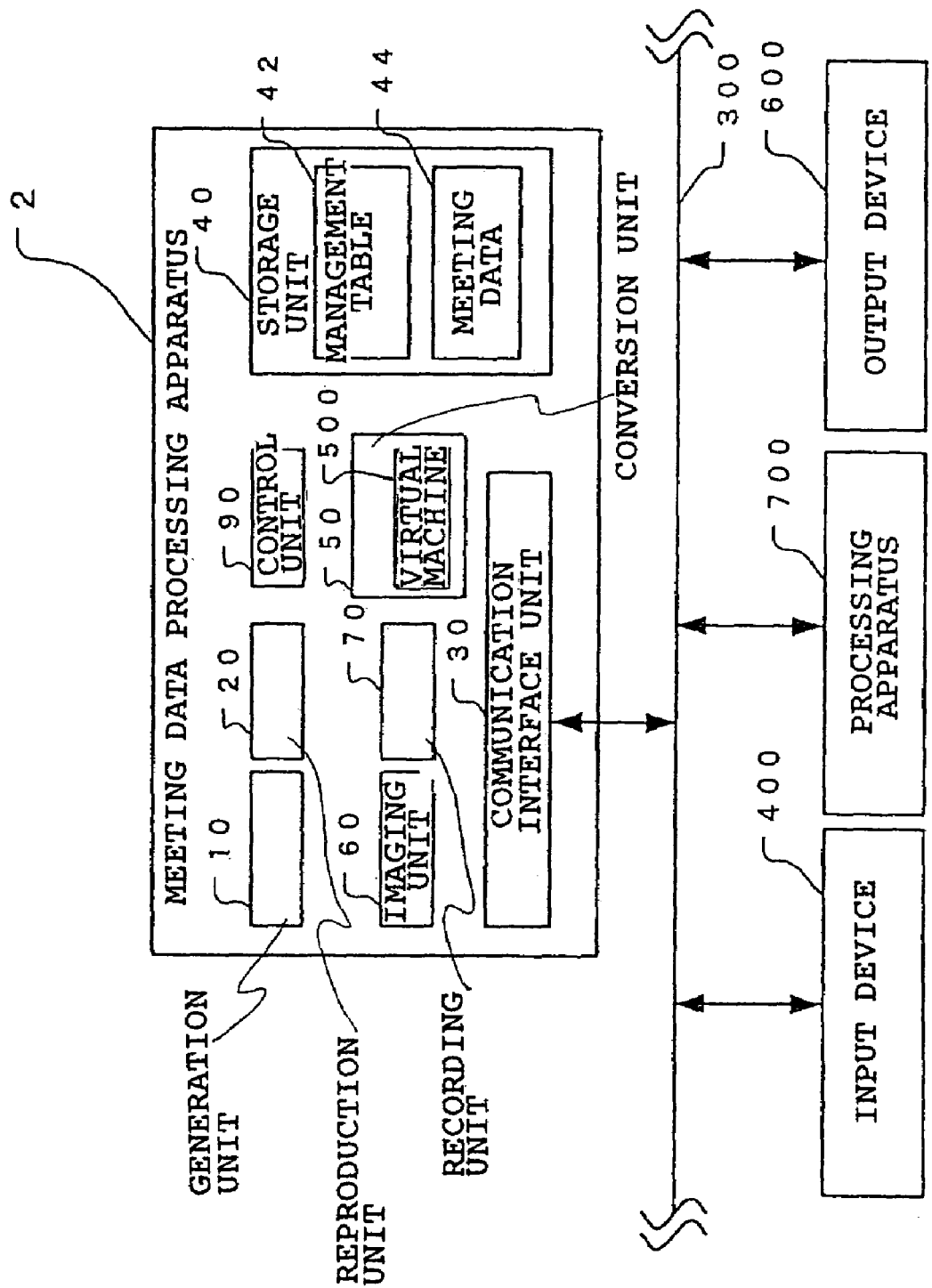
FIG. 1 is a schematic diagram of an example of a meeting system according to one embodiment.

FIG. 1 is a schematic diagram of an example of a meeting system according to the present embodiment.

As shown in FIG. 1, the meeting system includes an input device 400, an output device 600, a meeting data processing apparatus 2 serving as meeting data generating means for generating meeting data and also serving as meeting data reproducing means for reproducing meeting data, and a processing apparatus 700, wherein these devices are interconnected via an IEEE-1394 bus 300 serving as a high-speed transmission line.

Supplied-data is supplied from the input device 400 to the meeting data processing apparatus 2. The meeting data processing apparatus 2 generates meeting data on the basis of the received supplied-data and transmits the generated meeting data to the output device 600. The meeting data processing apparatus 2 also transmits and receives supplied-data to or from the processing apparatus 700.

Specific examples of the input device 400 include a tablet, a mouse, a keyboard, a scanner, a digital camera, a portable information terminal, a portable telephone, and a pointing stick. Examples of information (supplied-data) supplied from the input device 400 to the meeting data processing apparatus 2 include digitized coordinate information produced by a tablet, digitized information representing the trajectory of the movement of a pointing device over a tablet, coordinate information representing the trajectory of a mouse, character information input via a keyboard, sampled picture element information, and digitized audio information. Examples of the output device 600 include a display, a portable information terminal, and a printer.

One example of the meeting data processing apparatus 2 is a liquid crystal projector. Examples of the processing apparatus include a PC (personal computer), a WS (work station), an NC (network computer), a server device, and a host device.

These devices are combined to form one meeting system used at a single meeting place by a plurality of meeting participants in such a manner that meeting data is generated and reproduced in cooperation with these devices.

Herein, the computer such as a PC serving as the processing apparatus 700 is not an essential element in the meeting system. The processing apparatus 700 includes a processor, a ROM, a RAM, and a secondary storage device, wherein these elements may be regarded as constituent elements of the meeting data generating apparatus. In this specific example, in order to achieve good portability and reusability, the processing apparatus 700 is disposed in a separate case, thus the processing apparatus 700 is described as a separate unit.

Meeting systems are used not only in small-scale meetings which are held around a single table but also in large-scale meetings such as international conferences which are held at remote places connected to each other.

An embodiment of a meeting system for use in small-scale meetings in which one liquid crystal projector is used as a main device is described first, and then an embodiment of a meeting system for use in large-scale meetings at remote places in which a plurality of devices are used is described.

(Description of the Manner of Performing a Meeting)

Figure 2:
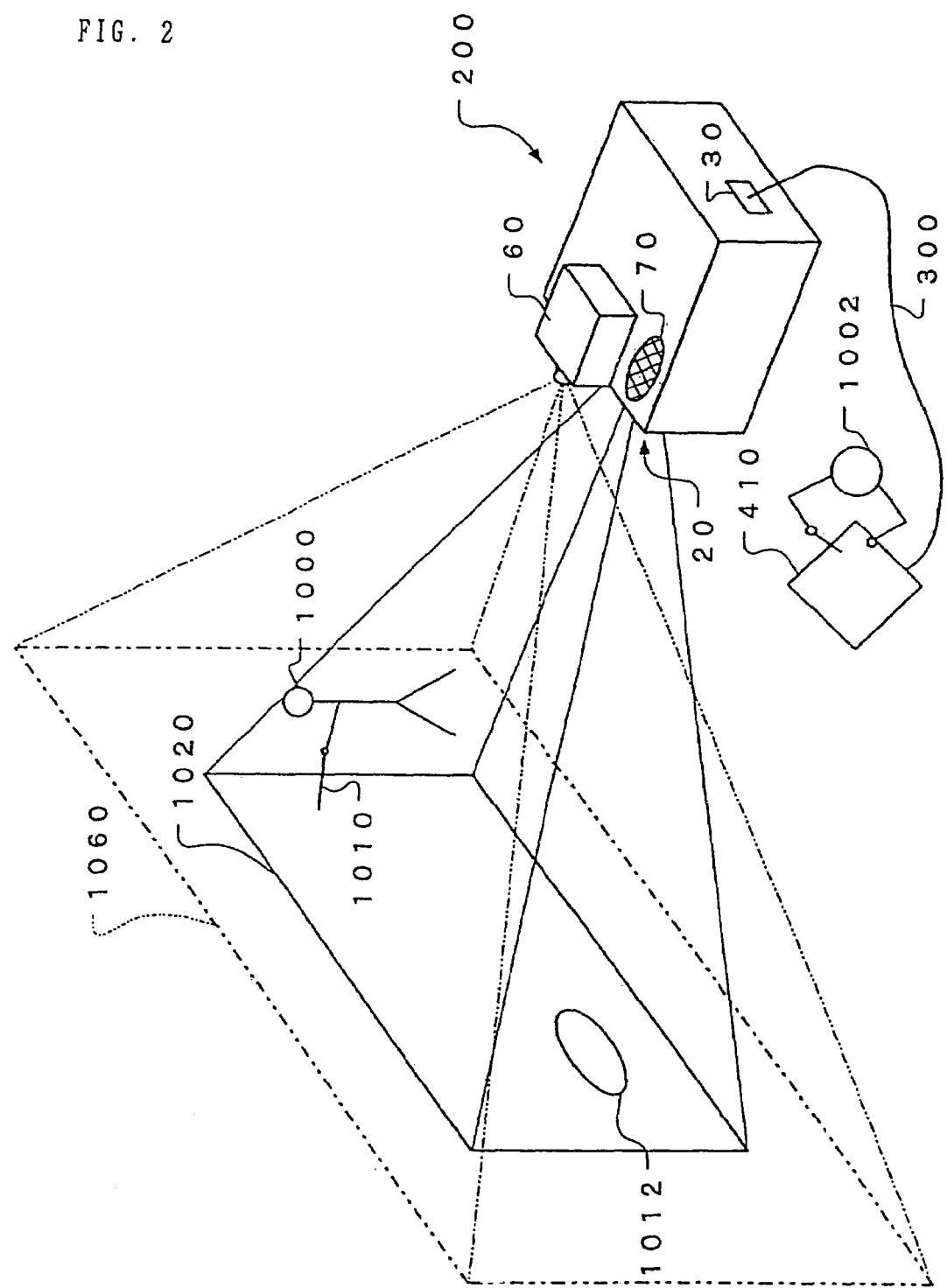
FIG. 2 is a schematic diagram illustrating an example of a situation in which a meeting is performed according to the embodiment.

FIG. 2 is a schematic diagram illustrating the manner of performing a meeting according the present embodiment.

In FIG. 2, a liquid crystal projector 200 serving as the meeting data processing apparatus 2 projects meeting data 44 shown in FIG. 1 onto a screen 1020, and a presenter 1000 is making a presentation using a pointing stick 1010.

A meeting participant 1002 is inputting data using a tablet 410 serving as the input device 400. The input data is supplied via the IEEE-1394 bus 300 to the communication interface unit 30 of the liquid crystal projector 200. In accordance with the supplied-data, the liquid crystal projector 200 projects point data 1012 serving as a part of the meeting data 44.

Herein, specific examples of the point data 1012 include character data for writing a character in a part of a projected image, graphic data for drawing a graphic in a part of a projected image, underline data for drawing an underline under characters in a projected image, and circle data for drawing a circle surrounding a part of a projected image.

The meeting participant 1002 views the point data 1012 input via the tablet 410, in addition to the presentation data.

In a practical situation of a meeting, it may be desired to play back presentation data including the motion of the presenter for a particular chapter and section thereof during the meeting, or it may be desired to check a part pointed out by a meeting participant 1002.

If the presentation data is produced using an application program on a PC, it is possible to play back the presentation data for a specified particular chapter and section. However, in this case, what can be displayed is only the presentation data, and information added by the meeting participant 1002 using the tablet 410 and the time at which the information was added cannot be reproduced.

It may be possible to take a picture of a meeting scene using a video recorder and play it back. However, in this case, in order to play back a specified particular chapter or section, it is required to perform a fast-forward or rewinding operation, and thus it takes a long time to reach a desired part. Furthermore, in this technique, it is impossible to reproduce only the parts pointed out by a particular one of meeting participants.

If the above problems are solved, it becomes possible to perform meetings in various efficient manners.

To the above end, in the liquid crystal projector 200 according to the present embodiment, as shown in FIG. 1, information is added using an imaging unit 60 for recording an image pointed to by a presenter, a recording unit 70 for recording digitized data of a speech during a meeting, or an input device 400, to presentation data produced using a PC serving as a processing apparatus 700, wherein the information is related to the addresses assigned to the respective devices and managed using a management table 42. The resultant data is stored as the meeting data in the storage unit 40.

The meeting system of the present embodiment is described in further detail below.

Figure 3:
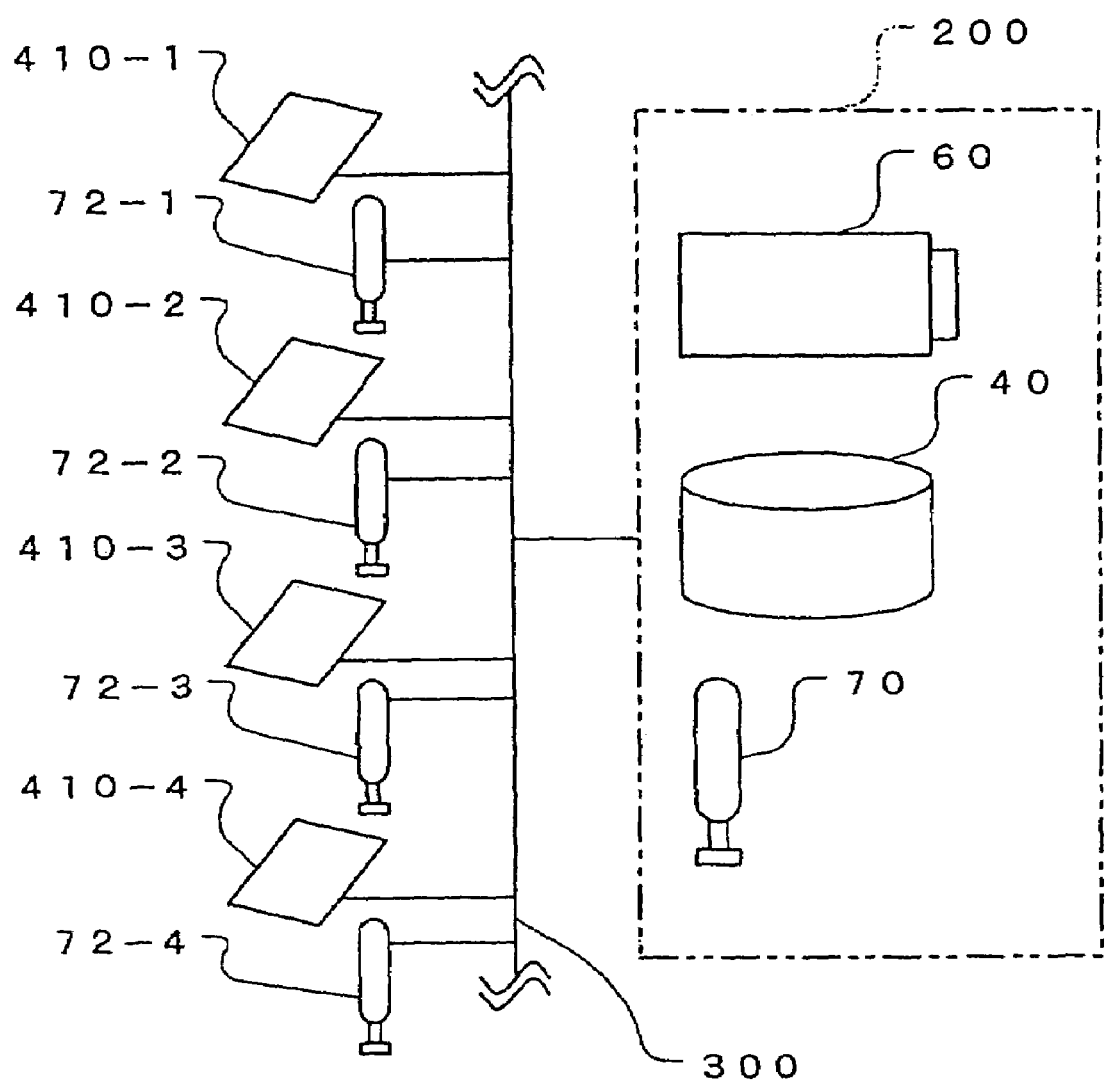
FIG. 3 is a schematic diagram illustrating an example of the configuration of the meeting system according to the embodiment.

FIG. 3 is a schematic diagram illustrating an example of the configuration of the meeting system according to the present embodiment.

In FIG. 3, four meeting participants 1002 input data using respective tablets 410-1 to 410-4, and the input data is stored in a storage unit 40 separately for each tablet 410.

Similarly, the speech of the presenter 1000 is recorded by the recording unit 70. The speech of each meeting participant 1002 is sampled by a voice digitizing device 72 serving as voice recording means disposed for each meeting participant 1002 and is stored as voice data in the storage unit 40, separately for each meeting participant 1002.

Herein, unique device addresses are assigned to the recording unit 70, the audio digitizing devices 72-1 to 72-4, and the tablets 410-1 to 410-4, respectively.

When voice information includes particular keywords which have been registered in advance, they are detected by means of voice recognition. The result of the voice recognition may be converted into character codes and stored as additional information added to the meeting data, or may be interpreted as a device control command. In the latter case, words such as "fast-forward" and "rewind" which have been registered in advance are translated into control commands used to control the operation of the liquid crystal projector 200 and then input to the control unit 90 shown in FIG. 1.

The meeting data 44, generated by the generation unit 10 shown in FIG. 1 and stored in the storage unit 40, is reproduced by the reproduction unit 20 shown in FIG. 1 for each presenter 1000 and for each meeting participant 1002.

The meeting data 44 is described in further detail below.

(Description of Meeting Data)

Figure 4:
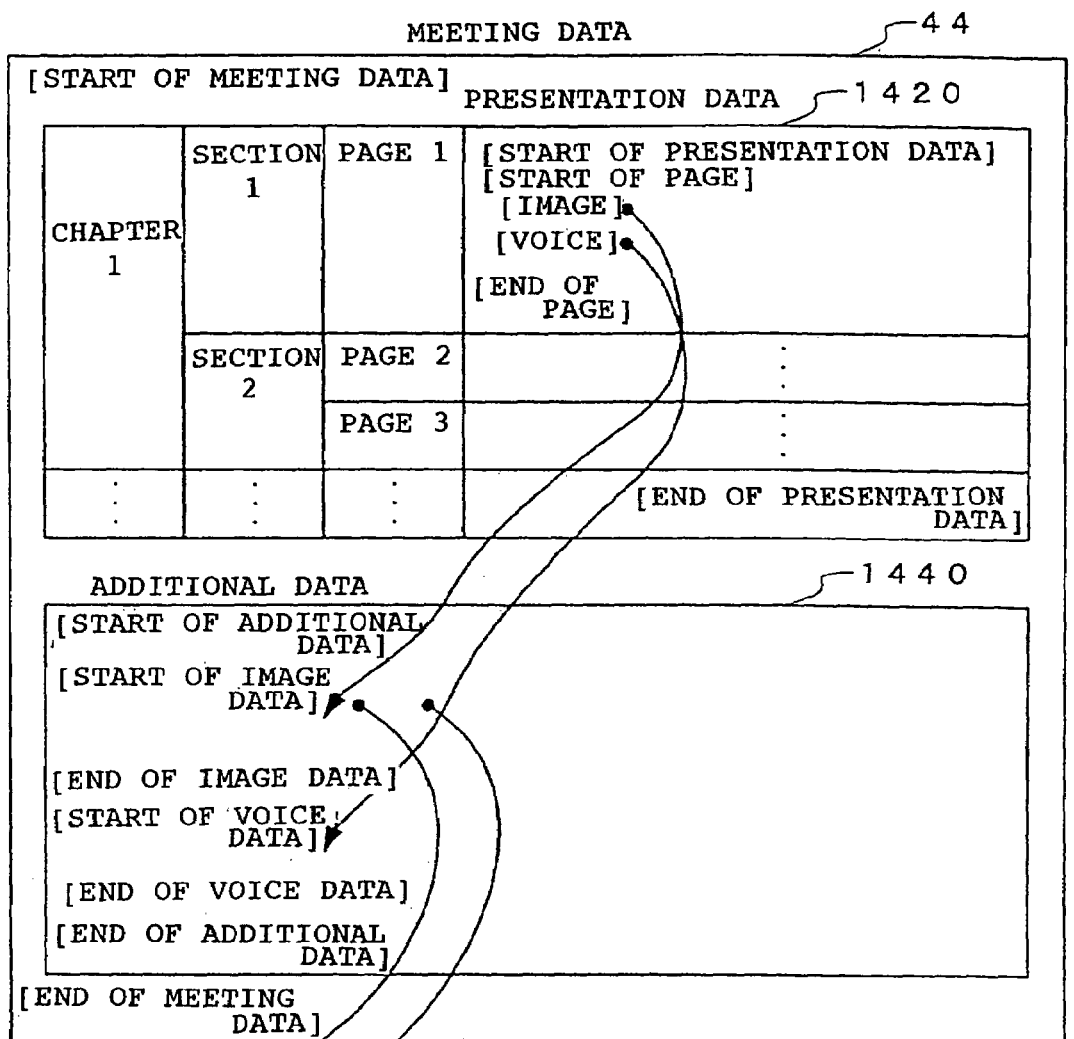
FIG. 4 is a schematic diagram illustrating an example of the data structure of meeting data and a management table according to the embodiment.

FIG. 4 is a schematic diagram illustrating an example of the data structure of meeting data 44 and a management table 42 according to the present embodiment.

The meeting data 44 is an electronic file including a plurality of data fields from a [START OF MEETING DATA] tag to a [END OF MEETING DATA] tag.

The meeting data 44 includes fixed presentation data 1420 prepared in advance and additional variable data 1440 which varies depending upon the situation of a meeting. In general, the presentation data 1420 is managed by a file system of an OS on a PC and stored in the storage unit 40 serving as a secondary storage device.

On the other hand, the additional data 1440 is managed by the control unit 90 operated by functions of the built-in OS of the liquid crystal projector 200 and is stored in the storage unit 40.

Furthermore, the meeting data 44 is identified by labels for respective particular units of a meeting.

Examples of the units are chapters, sections, and pages of sheets to be displayed. If chapters and sections are employed as the units, it is possible to specify particular data by a chapter number and a section number. This method of specifying data is very effective in particular in presentations.

In the present embodiment, as shown in FIG. 4, the presentation data 1420 includes labels attached to respective units, such as Chapter 1, Section 1, Page 1, and so on. The  tags or the like in the presentation data 1420 includes a pointer indicating the address of image data of additional data thereby allowing any desired part of the meeting data 44 to be read by specifying the chapter number, the section number, and the page number. In FIG. 4, arrows, except for those used as symbols, indicates examples of pointers and locations pointed to by the pointers.

In the case where pages are employed as the units, the units have a one-to-one correspondence with the units of a printed material. In the case of presentation using a PC, it is possible to add a moving image or voice data to a sheet of presentation data. In this case, each page of data is described in one frame and the moving image data or the voice data can be regarded as a part of data included in the corresponding frame of data.

In the art of PC printing, it is known to use a language (page description language) to describe the form of documents and printing information. A widely used example of such a language is PostScript developed by Adobe Systems, Inc. If the PostScript language is employed, the meeting data 44 can be easily described. In this case, image information and character information are described on a page-by-page basis using the programming language.

Using this programming language, an image can be described as a set of pixels. In the description language for the meeting data 44, the above concept is further extended such that the programming description may include a description indicating the reproduction of a sampled voice and a description indicating the reproduction of an animation. One known general-purpose programming language which is processed using an interpreter is the BASIC language. Although the BASIC language is different from the PostScript language in that the BASIC language does not include the concept of description of images in units of pages, the BASIC language may be advantageously used to reproduce voice data, animations, and the like.

In the present embodiment, by way of example but not of limitation, the JAVA language is employed as an interpreter language having some advantages of both BASIC and PostScript. The JAVA language includes drawing classes such as AWT (Abstracted Window Tools) and Swing which are defined in an abstracted fashion so as to be independent of processing systems. JAVA is a trademark of Sun Microsystems, Inc. of the USA.

Application software may achieve functions of performing desired processing using the functions of the classes.

For example, in order to use a line generation function in the drawing class, a line generation request command is issued to the class. If the conversion unit 50*a* shown in FIG. 1 includes a JAVA virtual machine installed thereon as the virtual machine 500, it is possible to draw a line picture element by executing a piece of program including the line generation request command, regardless of the type of the processing system. If a program is given which generates images in such a manner that drawing is performed a plurality of times in each unit period of time, it is possible to reproduce an animation.

As for voice data, the processing of sampled voice data is also described by the JAVA language.

The programs are developed and stored at a source code level where programs are described in character codes called high-level languages which are readable by human beings. No that the language for describing the meeting data 44 is not limited to the JAVA language. Various high-level languages such as the PASCAL language may also be employed, as is disclosed in Japanese Patent Application Publication No. 6-4498 filed by the present applicant.

As is described in FIG. 1 of Japanese Patent Application Publication No. 6-4498, the program described in such a high-level language is converted by a compiler into an intermediate language object which can be interpreted and executed by an intermediate language interpreter. In the present embodiment, intermediate language objects generated in the above-described manner are used as the meeting data 44.

In FIG. 4, a part from a [START OF PAGE] tag to an [END OF PAGE] tag is one unit related to one sheet. This one processing unit include an  tag and a [VOICE] tag. The  tag serves as a label of a sequence of variable length fields. The variable length fields include drawing commands described in the intermediate language converted by means of compilation from the high-level language. Still image data represented by a set of pixels is linked to a pixel transfer command and stored also in variable length fields.

Data associated with a [VOICE] tag is also stored in variable length fields.

The presentation data 1420 and the additional data 1440 shown in FIG. 4 may be rewritten, like usual electronic files on computers.

A rewritten part of the additional data 1440 is stored in a variable length data part enclosed by a [START OF ADDITIONAL DATA] tag and an [END OF ADDITIONAL DATA] tag. The variable length data part may include image data input via the tablet or the like and voice data input via a microphone or the like.

The image data is stored between a [START OF IMAGE DATA] tag and an [END OF IMAGE DATA] tag. The voice data is stored between a [START OF VOICE DATA] tag and an [END OF VOICE DATA] tag.

In the present embodiment, data obtained, during a meeting, by adding various additional data 1440 to the primitive presentation data (presentation data 1420) is referred to as meeting data 44 to distinguish them from each other. Both primitive presentation data and meeting data are electronic files which can be processed by a computer.

More specifically, voice data input to the voice digitizing device 72 is amplified by a microphone amplifier disposed in the voice digitizing device 72 to a level high enough to be recognized. The amplified voice data is then sampled into a digital signal by a sampling circuit disposed in the voice digitizing device 72. According to application software, the control unit 90 stores the resultant data in the storage unit 40 as the additional data 1440 which is a part of the meeting data 44.

In addition to the meeting data 44 including the presentation data 1420 and the distributed additional data 1440, the storage unit 40 also stores a management table 42 or the like used by the control unit 90 to manage data.

The management table 42 is a table used to manage data in such a manner as to distinguish associated devices such as the input device 400. Thus, the management table 42 includes IDs for identifying devices, device names, and data for identifying users of the devices.

For example, the result of an operation performed by the presenter 1000 using the pointing stick 1010 is stored as a part of the additional data 1440 in the storage unit 40. This image data is stored such that it is linked to the corresponding device ID. Therefore, it is possible to reproduce the image of the motion of the presenter 1000 by retrieving the corresponding image data stored in the additional data 1440 in accordance with the management table 42 and playing back it.

If time data is added, as the additional data 1440, to image data, it becomes possible to reproduce the meeting data 42 for a part corresponding to a specified time.

According to the present embodiment, as described above, it is possible to reproduce a meeting scene immediately after specifying a particular part such as a particular section. It is also possible to selectively reproduce a meeting scene by specifying a particular presenter 1000, meeting participant 1002 or time.

Now, the role of the input device 400 is described below. An example of the input device 400 is a tablet 410. The tablet 410 comprises a digitizing unit, a coordinate detector, an I/O controller, and an IEEE-1394 bus class driver.

The I/O controller of the tablet 410 has a target-side node capability according to the SBP-2 protocol. On the other hand, the I/O controller of the liquid crystal projector 200 controls the SBP-2 driver having an initiator-side node capability according to the SBP-2 protocol.

The storage unit 40, which is a local memory of the liquid crystal projector 200, is opened as a common memory by the SBP-2 driver over the IEEE-1394 bus 300.

The IEEE-1394 bus class driver of the tablet 410 performs a bus-level transaction, defined in the standard IEEE 1394-1995, with the IEEE-1394 bus class driver of the liquid crystal projector. Through the transaction, the tablet 410 logs into the SBP-2 driver via the IEEE bus class driver and obtains permission of access to the shared memory space.

If the log-in is accepted, it becomes possible for the tablet 410 to access the storage unit 40, serving as a common memory space, of the liquid crystal projector, until the tablet 410 performs a logging out process through the IEEE-1394 bus class driver.

If a pointing operation is performed upon the tablet 401 by the meeting participant 1002, position detecting is performed by a digitizing unit, and the relative position is calculated by a coordinate detection unit so as to obtain pointing coordinates and a sequence of trajectory data. As a result of the operation of the SBP-2 protocol described above, the pointing coordinate data and the trajectory data are stored in the shared memory space provided by the liquid crystal projector 200.

The common memory space is a local memory space when seen from the liquid crystal projector 200. Therefore, as required, the liquid crystal projector 200 can allocate or copy this common space in a memory space managed by a process or thread of the virtual machine 500, using the kernel of the built-in OS. From another viewpoint, the process or the thread of the virtual machine 500 of the liquid crystal projector 200 can monitor the trajectory of the pointing operation over the tablet 410 performed by a user.

Generation of meeting data in a practical meeting system is described below.

(Description of Processing Performed in the Meeting System)

Figure 5:
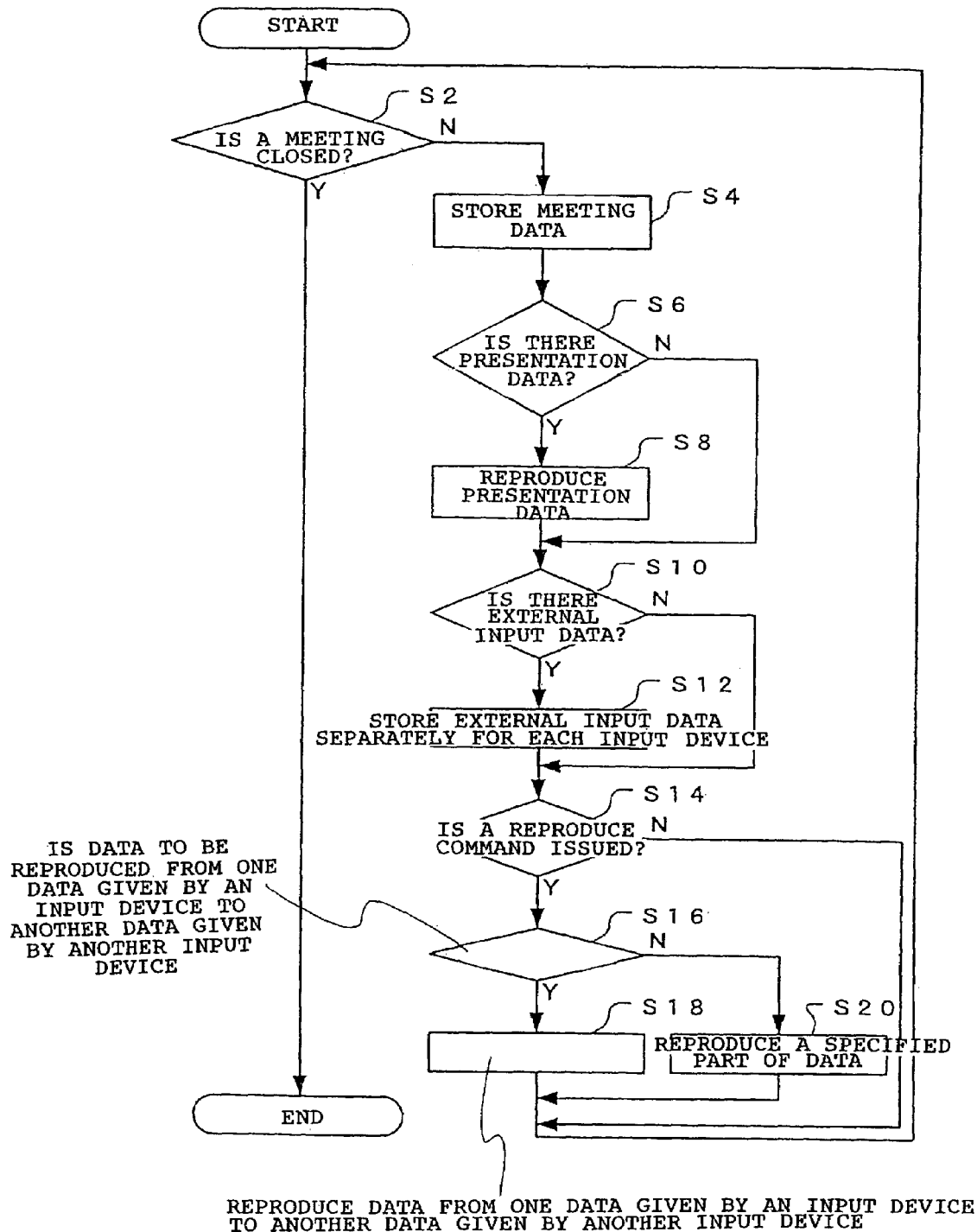
FIG. 5 is a flow chart illustrating the processing flow associated with the meeting system according to the embodiment.

FIG. 5 is a flow chart illustrating the processing flow associated with the meeting system according to the present embodiment.

When a meeting is started, generation of meeting data is started and continued until the end of the meeting.

After the meeting is started, if the meeting has not been closed (step 2), the control unit 90 stores the meeting data 44 in the storage unit 40 (step 4).

If presentation data generated by a PC or the like is stored in the storage unit 40 (step 6), the reproduction unit 20 reproduces the presentation data 1420 read by the control unit 90 from the storage unit 40 (step 8).

More specifically, the liquid crystal projector 200 projects the presentation data. If there is voice data, the voice data is also reproduced.

If there is no presentation data (step 6), nothing is performed externally, but internal processing is continued.

If there is external input data (step 10), the control unit 90 manages the input data in units of data associated with source devices and stores the input data into the storage unit 40 (step 12).

More specifically, for example, when supplied-data including drawing command information is received from the tablet 410, the control unit 90 stores not only the supplied-data but also the identification information or the like associated with the tablet 410 so that the supplied-data is managed in units of data associated with source devices using the management table 42.

Some supplied-data or the like is stored as the additional data 1440. The additional data 1440 includes not only the data input from the tablet 410 but also image data in the image capturing range 1060 taken by the imaging unit 60 shown in FIG. 2. That is, position data or the like indicating a position of an image pointed to by the presenter 1000 using a pointing stick 1010 or a finger is also stored as the additional data 1440.

The meeting data 44 is produced in the above-described manner.

If there is no external data (step 10), nothing is performed externally, but internal processing is continued.

If a reproduction command is issued by a meeting participant 1002 by operating reproduction command issuing means such a remote control unit (step 14), the control unit 90 reads the meeting data 44 in particular units specified by the reproduction command (steps 16-20).

For example, if the reproduction command specifies that the meeting data 44 is to be reproduced in units of data associated with source devices (step 16), the meeting data 44 is reproduced in units of data associated with source devices (step 18).

If the specified reproduction command is not for each source devices (step 16), a specified part of the meeting data is reproduced (step 20). More specifically, for example, the control unit 90 determines which chapter and section of the presentation data 1420 are specified and reads the specified part of the meeting data 44 from the storage unit 40. The data read by the control unit 90 is then reproduced by the reproduction unit 20. Thus, the specified part of data is reproduced.

Instead of specifying either source devices or a particular part in an alternative fashion, it may also be possible to specify both source devices and a particular part at the same time.

The manner of generating and reproducing meeting data has been described above. In the example described above, the tablet 410 is used as the input device 400. Another example is described below in which a PC 420 is used as the input device 400.

(Example of a Meeting System in which a PC is Used as the Input Device)

Figure 6:
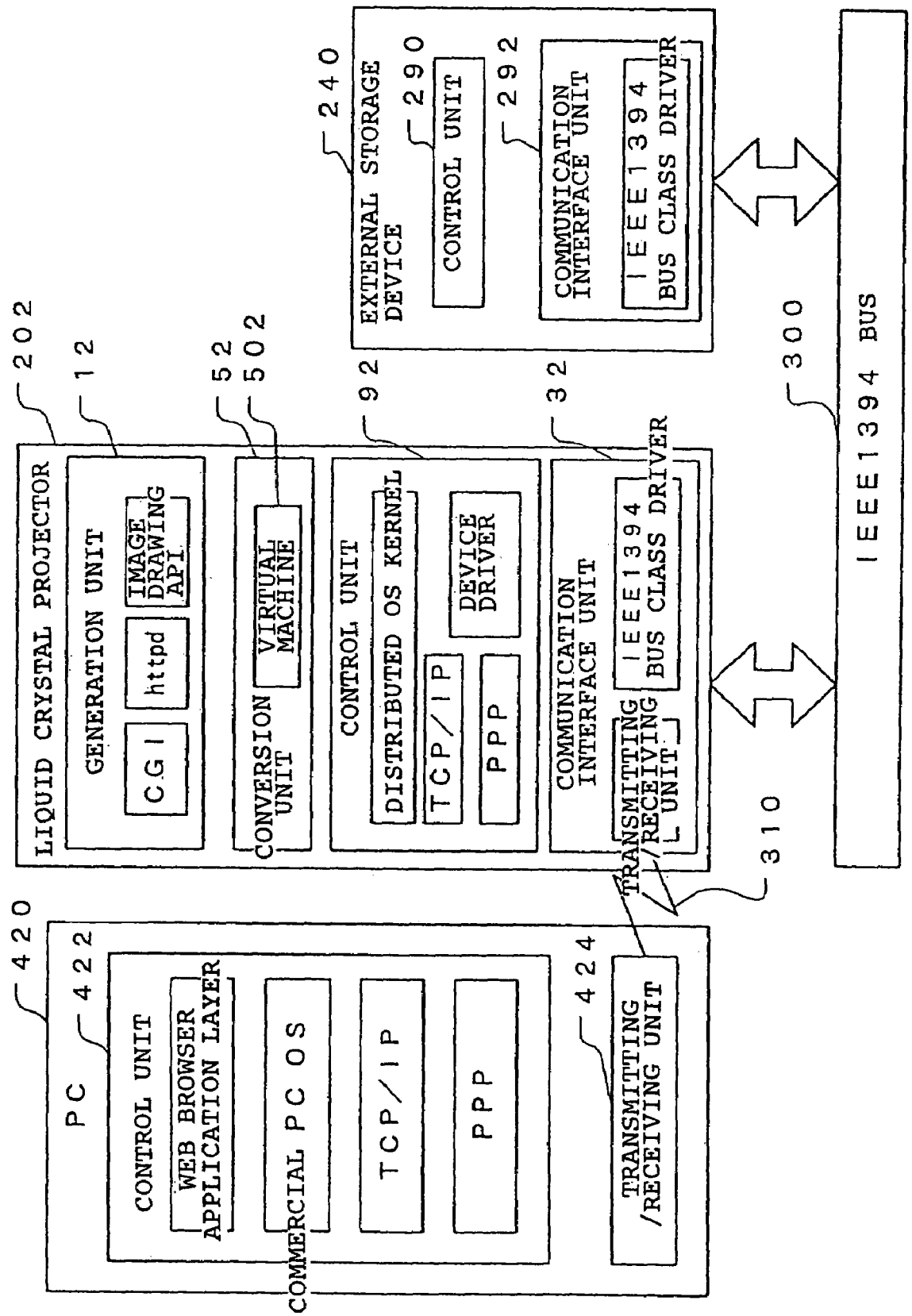
FIG. 6 is a functional block diagram of an example of a meeting system according to another embodiment.

FIG. 6 is a functional block diagram of a meeting system according to another embodiment.

A liquid crystal projector 202 and an external storage device 240 are connected to each other via an IEEE-1394 bus 300, and the liquid crystal projector 202 and a PC 420 are connected to each other via an optical fiber network 310.

This type of meeting system may be used, for example, when a meeting is held at remote places connected to each other. Herein, let us assume that the PC 420 located in the USA issues a drawing command to the liquid crystal projector 202 located in Japan.

More specifically, we assume herein that a presentation is performed using the projector 200 at a meeting place in Japan, and a meeting participant 1002 in the USA displays the presentation screen using the PC 420 and writes on the presentation screen generated by the liquid crystal projector 200 in Japan.

The PC 420 includes a control unit 422 and a transmitting/receiving unit 424, wherein the control unit 422 includes software such as a Web browser for displaying the presentation screen, an OS (operating system), TC/IP (Transmission Control Protocol/Internet Protocol), and PPP (Point to Point Protocol), and the transmission/receiving unit 424 includes an ATM switch.

The liquid crystal projector 202 includes a generation unit 12, a conversion unit 52, a control unit 92, and a communication interface unit 32, wherein the generation unit 12 includes software such as a CGI (Common Gateway Interface) program, an httpd (Hyper Text Transfer Protocol Daemon) program, and a drawing API (Application Programming Interface) program, the conversion unit 52 include a virtual machine 502, the control unit 92 includes software such as a distributed OS kernel, a TCP/PP program, a PPP program, and an IEEE-1394 bus class driver, and the communication interface unit 32 includes a transmitting/receiving unit (including an ATM switch) and an IEEE-1394 bus class driver.

The external storage unit 240 includes a control unit 290 and a communication interface unit 292 including an IEEE-1394 bus class driver.

Generation of meeting data in the present meeting system is described below.

When a presentation image is displayed on the PC 420 in the USA, the meeting participant 1002 operates the PC 420 so as to write into the presentation image on the Web browser on the screen.

This operation command is converted by the control unit 422 into a format according to the TCP/IP protocol or the like and supplied-data including the operation command is converted into a format which allows a compiler to convert the supplied-data into a data format for generating meeting data. The resultant supplied-data is transmitted from the transmitting/receiving unit 424 to the liquid crystal projector 202 via the optical fiber network 310.

In the liquid crystal projector 202, the communication interface unit 32 receives the transmitted supplied-data, and the control unit 92 performs a transfer control operation. The transmitted supplied-data is converted by the virtual machine 500 into a data format which allows generation of meeting data, and the generation unit 12 generates meeting data.

The supplied-data received from the PC 420 and the generated meeting data are transmitted from the communication interface unit 32 to the external storage unit 240 via the IEEE-1394 bus 300. In the external storage unit 240, the supplied-data and the meeting data received via the transmitting/receiving unit 292 are stored by the control unit 290 wherein the supplied-data and the meeting data are managed by the control unit 290 in predetermined units of data associated with the respective processing apparatus.

The generated meeting data is displayed at the meeting place in Japan using the liquid crystal projector 202 and is also transmitted to the PC 420 via the communication interface unit 32. The PC 420 again displays the received meeting data on the screen.

Although data having a large size, such as the meeting data, is transmitted in the transmitting/receiving process and the data transmission process described above, use of the IEEE-1394 bus 302 and the optical fiber network 310 allows the transmission to be performed at a very high speed.

Thus, the meeting participant 1002 in the USA can remotely operate the liquid crystal projector 202 as if the meeting participant 1002 were operating it at the presentation place in Japan.

Because the supplied-data and the meeting data are stored in the external storage device 240 connected to the PC 420 via the high-speed transmission line, a desired part can be immediately reproduced in response to an operation of the PC 420.

Thus, it is possible to realize a meeting system capable of quickly playing back meeting data even when a meeting is held at remote places.

By providing the external storage device 240 for storing the meeting journal (history) separately from the projector 202, it becomes possible to construct the external storage device 240 with hard disks in the form of RAID (Redundant Array of Inexpensive Disks), thereby achieving high reliability of data and high storage capacity without having to change the size of the liquid crystal projector 202.

Even in the case where the storage device for storing the meeting data is provided in a form separate from the liquid crystal projector 202, substantially no problems occur because communication between the liquid crystal projector 202 and the external storage device 240 is performed at a very high speed.

In the example described above, the PC 420 is used as the input device 400. Now, another example is described below in which a server device is employed as the input device 400 thereby distributing supplied-data.

(Example of a Meeting System Using a Server Device as a Data Distributing Device)

Figure 7:
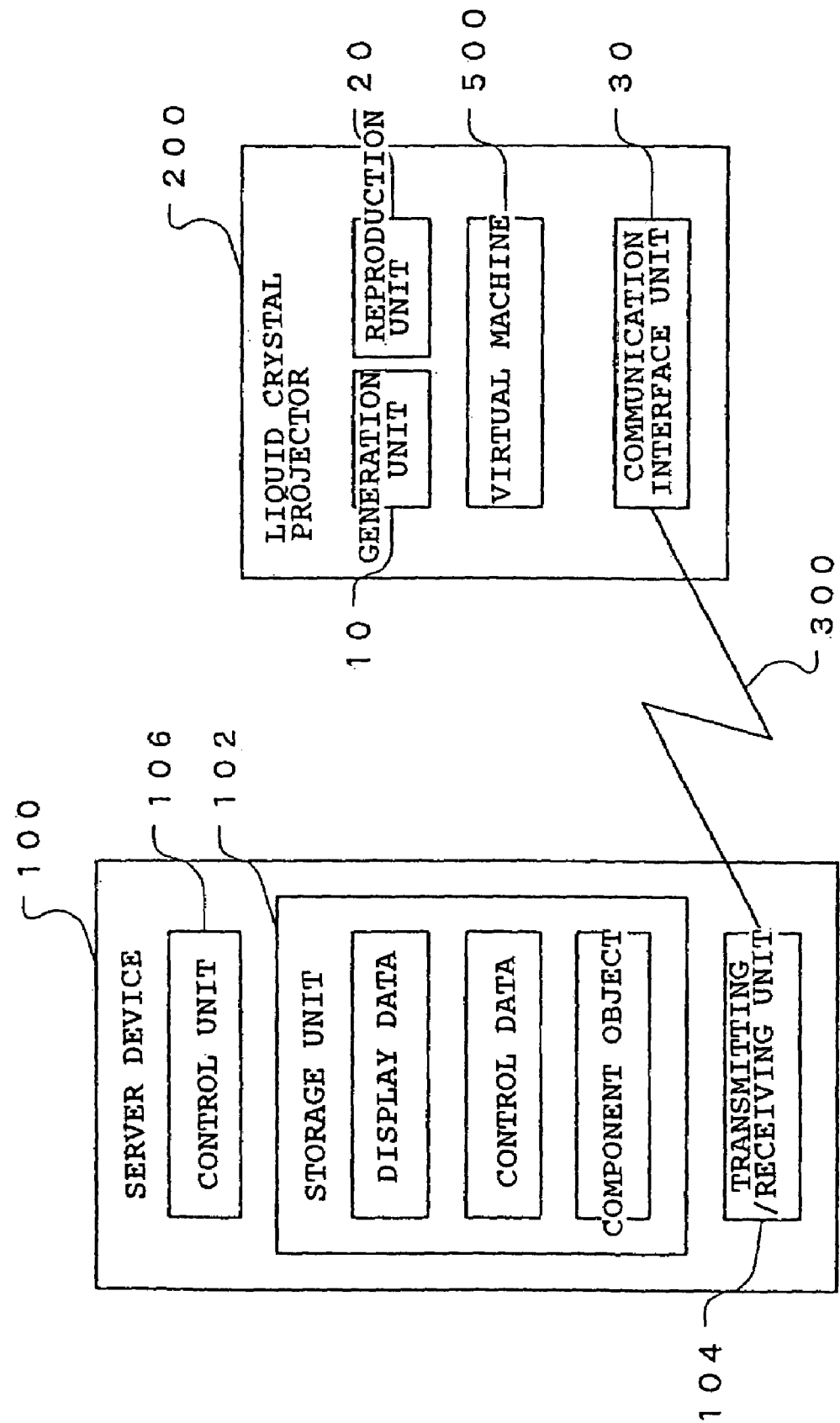
FIG. 7 is a functional block diagram of still an example of a meeting system according to another embodiment.

FIG. 7 is a functional block diagram of a meeting system according to yet another embodiment.

In the present embodiment, the meeting system includes a liquid crystal projector 200 for reproducing meeting data and a server device 100.

The liquid crystal projector 200 is similar to the liquid crystal projector 200 described above.

The server device 100 includes a storage unit 102 for storing display data, control data, component objects, etc., a transmitting/receiving unit 104, and a control unit 106 for controlling transmission of data between the storage unit 102 and the transmitting/receiving unit 104.

Specific examples of the display data include image data, presentation data, and meeting data. Specific examples of the control data includes a device driver, data such as coordinates for specifying the drawing range, and data for specifying the type of an object to be drawn, such as a line, a circle, etc.

The processing system should be designed taking into account the fact that image data can be generated in two different forms. In the first form, the whole of an image is described as a set of pixels. When a photograph of a natural image is sampled using an image scanner, each pixel is described by halftone color data, and the image as a whole is described by a set of such pixels.

In the second form, pixels are generated by command words. For example, in a processing system which represents a graphics image by a combination of lines, Bezier curves, circular arcs, and the like, a line generation command (which generally specifies the start coordinates, the end coordinates, and the width of a line to be drawn) generates pixels by generating a sequence of points depending upon the resolution and the coordinate system of the processing system, thereby drawing a part of a graphics image.

In most cases, computers have an image display system capable of representing images by a set of pixels according to the former method and also by command words according to the latter method. When characters are generated using an outline font, the original shapes of characters are described by line and curve drawing command words. In this case, therefore, the latter method is used. As will be described later, drawing of an image over a wide area using a plurality of liquid crystal projectors by means of generation of pixels according to command words is one example in which distributed processing may be advantageously used.

When pixels are generated according to drawing commands, a program for generating pixels is necessary, wherein the program has to be executable on hardware including a processor. In the present embodiment, such an execution unit of program are referred to as "component object".

A component object is used as a part of software for generating or reproducing an image. Specific examples of component objects include JAVA applets and JAVA Beans.

Herein, let us assume that the server device 100 is a Web server and that various data for generating meeting data are stored in the storage unit 102.

The liquid crystal projector 200 is capable of downloading device drivers, JAVA applets, and the like from the server device 100.

This makes it possible to easily extend the functions of the liquid crystal projector 200. That is, when it is required to hold a meeting in a new fashion, the convener of the meeting may store necessary information in the server device 100 and the meeting participant 1002 may acquire necessary information from the server device 100 and incorporate it into the liquid crystal projector 200, thereby quickly adapting to the meeting in the new fashion.

More specifically, for example, when the liquid crystal projector 200 currently has a function of drawing a line in a part of the screen, if a component object having a function of enclosing a part of the screen with a circle is received and incorporated into a program for generating meeting data, the liquid crystal projector 200 acquires an additional function of enclosing a part of the screen with a circle.

Because functions can be extended using not hardware but software, it is possible to simplify the liquid crystal driving circuit or the like. In the liquid crystal projector, image data is generally converted by an A/D converter into a digital signal, and image information is stored in a first frame memory. Subsequently, the convolution of the image information is calculated by the digital filter, and the resultant data is stored in a second frame memory. The image data stored in the second frame memory is then read in a fixed cycle by the liquid crystal controller to display the image data on a liquid crystal light valve.

Herein, the convolution refers to a technique of filtering an image so as to modify the image quality by changing tap coefficients according to the sharpness of the image.

In these driving circuits, the image is degraded by a phase difference due to a difference in input image data. A high-performance PLL circuit or the like is required to reduce the phase difference. When a plurality of liquid crystal projectors with different resolutions are interconnected, it is required to provide a scaling circuit for performing image processing so as to interpolate an image. However, such image processing causes degradation in image quality.

In the present embodiment, when image data is input to the liquid crystal projector 200, application software, which operates various parts of the liquid crystal projector 200 including the virtual machine 500, performs data conversion upon the input image data in accordance with the number of pixels of the liquid crystal without causing image degradation which will occur when image processing is performed using the scaling circuit. In this technique, it is not required to dispose a plurality of frame memories, it is possible to simplify the circuit configuration.

A specific example of such application software is one which generates an image to be displayed on a VRAM according to the image data input via the virtual machine 500 and then displays the image on the VRAM onto the liquid crystal panel via the liquid crystal controller.

The present invention has been described above mainly for the combination of the liquid crystal projector 200 and the input device 400. Similar advantages are also obtained for a combination of the liquid crystal projector 200 and the output device 600.

That is, meeting data is generated using the liquid crystal projector 200, and the generated meeting data is transmitted, using the communication interface unit 30, to the output device 600.

Herein, if a printer is employed as the output device 600, the meeting participant 1002 may issue an output command to print the meeting data.

On the other hand, if a display is employed as the output device 600, the meeting participant 1002 may issue an output command to display the meeting data.

In these cases, the output command may also be issued in particular units of data associated with the respective input devices 400, and the meeting participant 1002 can obtain the requested meeting data immediately after issuing the command.

Although the meeting system may be constructed using the liquid crystal projector 200 as a main device as in the above-described examples, the meeting system may also be constructed in another fashion using a control device.

(Example of a Meeting System Using a Control Device)

Figure 8:
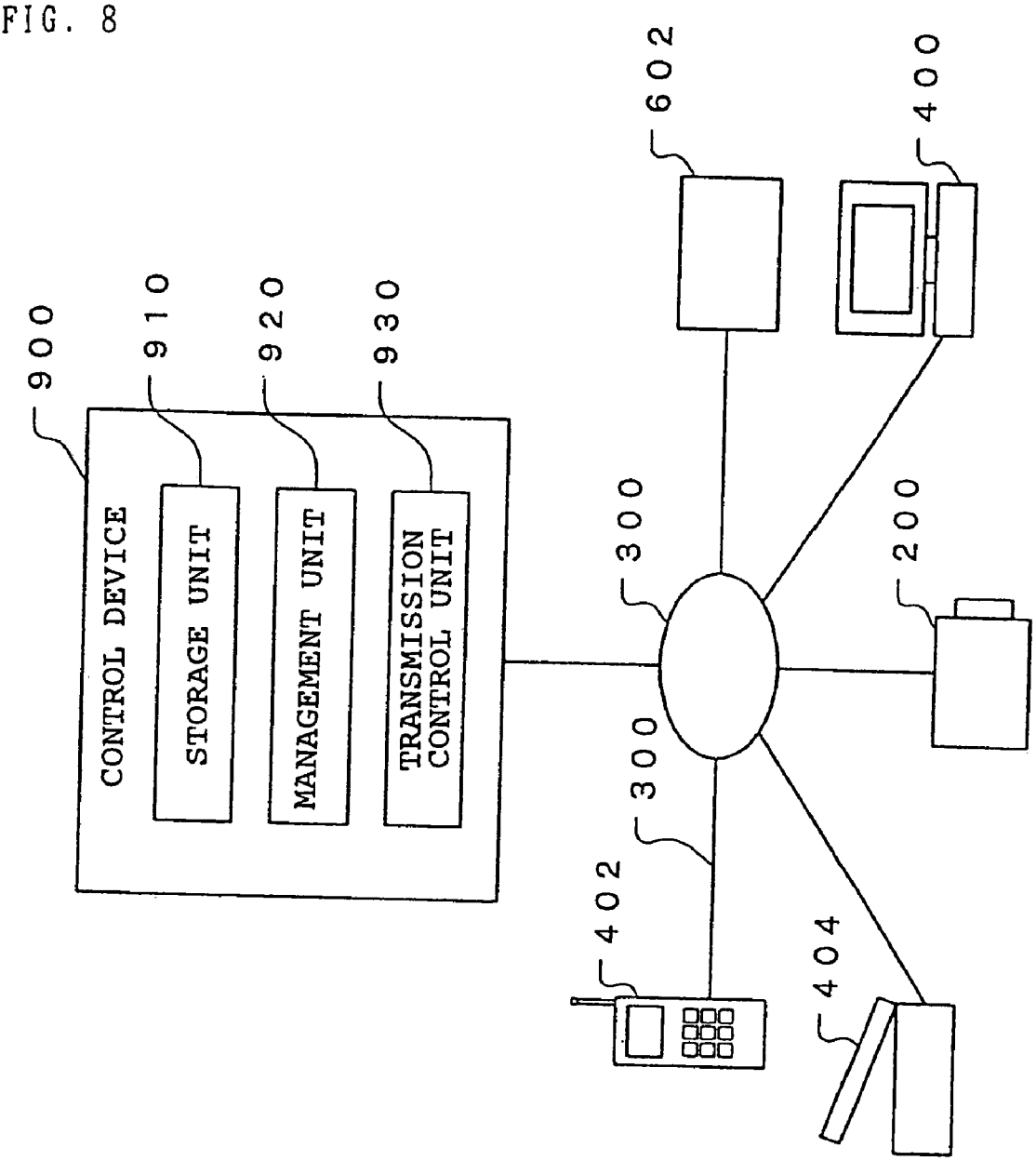
FIG. 8 is a schematic diagram illustrating a meeting system using a control device.

FIG. 8 is a schematic diagram illustrating a meeting system using a control device 900.

One control device 900 is connected to a plurality of processing apparatus for processing meeting data, via a network including IEEE-1394 buses 300 serving as transmission lines, so that supplied-data is transmitted and received among the processing apparatuses and meeting data is generated thereby.

The control device 900 includes therein a storage unit 910, a management unit 920 for managing connections of the respective processing apparatus with the network and also managing the data in the storage unit 40, and a transmission control unit 930 for controlling transmission of data within.

Examples of processing apparatus include a portable information terminal 402, a scanner 404, a liquid crystal projector 200, a PC 400, and a printer 602.

In this meeting system, meeting data is processed as described below.

Figure 9:
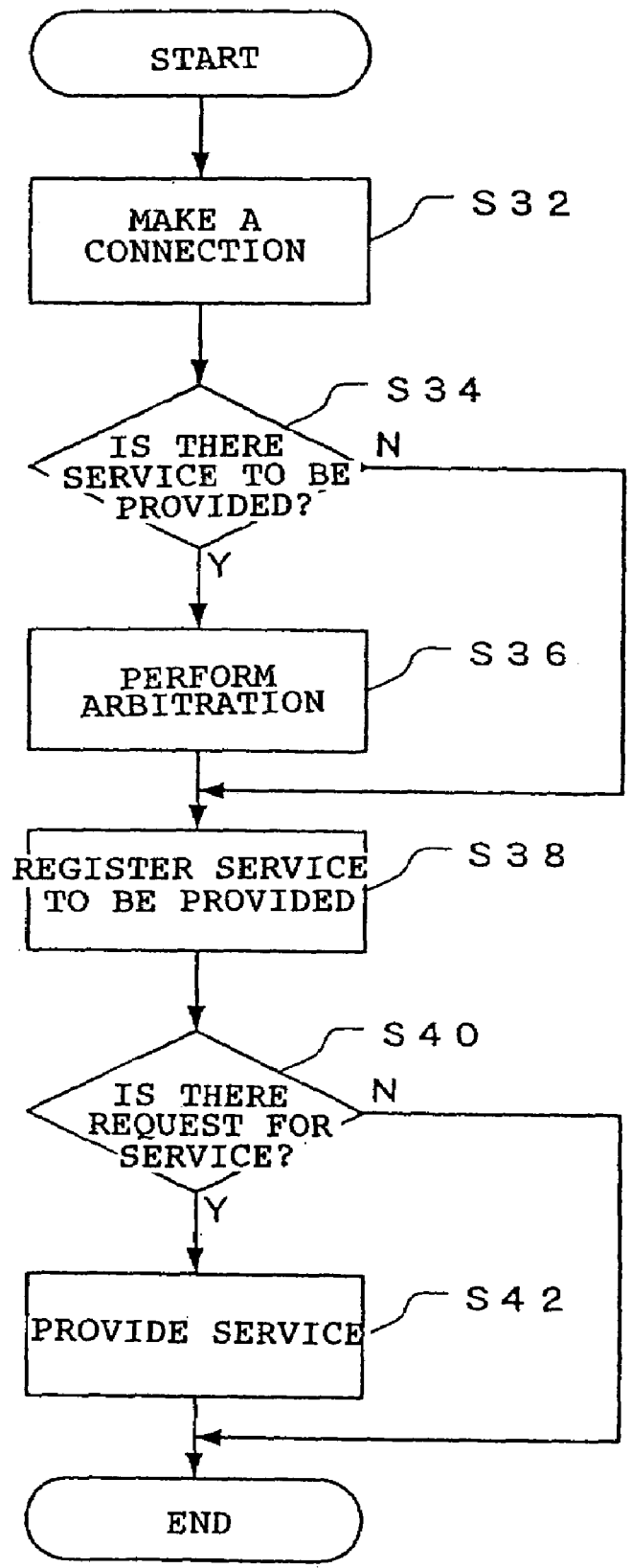
FIG. 9 is a flow chart illustrating the processing flow associated with the meeting system using the control device.

FIG. 9 is a flow chart illustrating the processing flow associated with the meeting system using the control device 900.

First, the control device 900 is activated and connected to the IEEE-1394 bus 30. In this state, other processing apparatus are also connected to the IEEE-1394 bus 300 (step 32).

When a certain processing apparatus is connected, supplied-data including a packet indicating the connection and also indicating a service to be provided by that processing apparatus is transmitted to the control device 900. Herein, services refer to functions provided by the respective processing apparatus.

Upon receiving the supplied-data including the above packet, the control device 900 checks, using the management unit 920, the management table stored in the storage unit 910 to detect already-registered services (step 34). If an identical service to be provided has been already registered, arbitration such as assignment of priorities is performed (step 36).

After checking the service, the management unit 920 registers the service in the management table (step 38).

FIG. 10 is a schematic diagram illustrating an example of the management table 912.

The management table 912 includes, mainly, IDs for identifying the respective processing apparatus, services provided by the respective processing apparatus, and the status of the respective processing apparatus. The IDs for identification are uniquely assigned so that different processing apparatus do not have the same ID even when a great number of processing apparatus are connected to the network.

If the control device 900 receives supplied-data including a packet indicating a service request (step 40), the control device 900 searches, using the management unit 920, the management table 912 for a processing apparatus which is available for providing the requested service.

For example, when the portable information terminal 402 issues a request for printing of a part of the meeting data, the control device 900 searches, using the management unit 920, the management table 912 for a processing apparatus which provides a printing service. If the printer 602 is detected as an apparatus which provides the printing service, the control device 900 then checks the status of the printer 602. If the printer is available for use, the transmission control unit 930 establishes a connection between the portable information terminal 402 which has issued the request for the service and the printer 602 which is to provide the service.

Once the connection has been established, it becomes possible to transmit and receive supplied-data such as the meeting data between the requesting apparatus and the providing apparatus without having to pass the data through the control device 900.

In this specific case, for example, a part of the meeting data is transmitted from the portable information terminal 402 to the printer 602 after the establishment of the connection, and the printer 602 provides the printing service (step 42).

As described above, the use of the control device 900 makes it possible to realize a meeting system capable of managing the services in a centralized fashion and flexibly changing processing apparatus in accordance with a meeting situation.

Also in such a meeting system, it is desirable that the virtual machine 500 be provided in the control device 900 and in the respective processing apparatus. The use of the virtual machine 500 allows supplied-data to be transmitted without concern for the type of an apparatus to which the supplied-data is to be transmitted and the type of the OS used in the apparatus. This allows the apparatus to be configured more freely, thereby allowing meetings to be performed in a variety of fashions.

One known technique of realizing the connection between the control device 900 and a plurality of processing apparatus is the Jini technique developed by Sun Microsystems, Inc. of the USA. However, the technique according to the present embodiment is significantly different from the Jini technique in that the meeting data 44 shown in FIG. 4 can be stored in the storage unit 910 and the meeting data 44 in the storage unit 910 can be updated and managed.

In the examples described above, each processing apparatus provides one service. Now, another example is described below in which one service is provided by a plurality of meeting data reproducing apparatuses, that is, meeting data is reproduced by means of distributed processing.

(Description of Distributed Processing)

A large number of application software developed under commercial PC OSs are translated by means of compilation into machine language which can be directly interpreted by a microprocessor. In this technique, it is generally required, from the beginning of the development, to take into account the architecture of microprocessors by which the application software is to be used and also the programming interface with service routines of OSs (such an interface is generally called API (Application Programming Interface)).

In the meeting system according to the present embodiment, the liquid crystal projector 200 or a PC or a WS used as the processing apparatus 700 is used as a main apparatus which translates and executes the meeting data 44 or primitive presentation data.

When the liquid crystal projector 200 is produced for commercial use, in order to provide best apparatuses with reasonable prices to users, the design thereof should not be based upon a particular microprocessor. This is also true for the processing apparatus 700. In some cases, it is desired to use a portable information terminal as the processing apparatus 700 instead of a PC or a WS. This can occur, for example, when it is desired to use the processing apparatus 700 at an outside place.

If it is assumed to have various different environments in which various types of microprocessors with different specifications and various OSs with different APIs are used together, an interpreter of a virtual machine (such as the virtual machine 500) should be used to handle the differences by means of abstraction thereby providing an environment in which any apparatus can be used in common.

One main problem which can be solved by the use of a virtual machine interpreter is elimination of differences in machine architecture (abstraction of execution environments).

Supplied-data such as moving image data, which is transmitted and received within the meeting system, has a large data size. In particular when a meeting is performed for a long time such as several hours, a large amount of data is frequently transmitted and received.

In order to efficiently deal with a lot of data with large data sizes, not only the interpreter of the virtual machine but also a high-speed transmission line and distributed processing are required so that processing loads are dynamically distributed among the processing apparatuses.

FIGS. 11(A)-(B) illustrate an example of a manner in which an image is displayed by means of distributed processing, wherein FIG. 11(A) illustrates an example in which an image is displayed using only one liquid crystal projector and FIG. 11(B) illustrates an example in which an image is displayed using four liquid crystal projectors.

In the case where an image is displayed using one liquid crystal projector 200, when a PC which provides meeting data to the liquid crystal projector 200 has a UXGA resolution, that is, a resolution of 1600{×}1200 dots, if the liquid crystal projector has an XGA resolution, that is, a resolution of 1024{×}768 dots, there is a possibility that, in response to a command issued by a presenter, a pointer points to coordinates such as (1500, 920) which can be displayed on the PC but cannot be displayed by the liquid crystal projector 200.

If such an event actually occurs, the liquid crystal projector 200 cannot display the coordinates as shown in FIG. 11(A). In this case, the pointer does not move in accordance with the command issued by the presenter. This could prevent the presentation from being effectively performed.

The above problem can be avoided if four liquid crystal projectors 200 are used to project four images 1210-1 to 1210-4, respectively, in a task-distributed fashion so as to support the area corresponding to the display area of the PC, as shown in FIG. 11(B).

Figure 12:
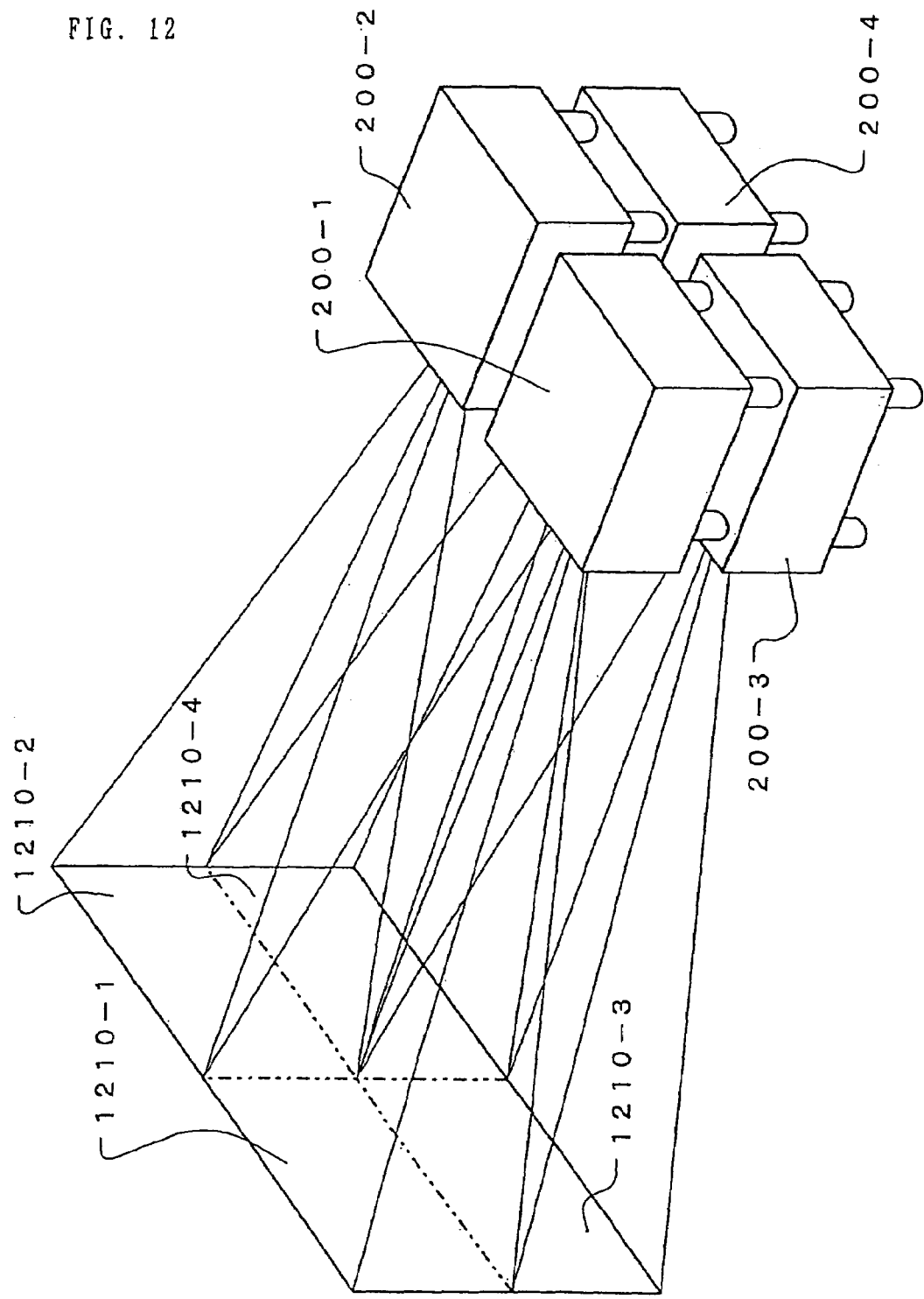
FIG. 12 is a schematic diagram illustrating a manner in which an image is displayed using four liquid crystal projectors in a task-distributed manner such that the respective liquid crystal projectors display particular parts of the image.

FIG. 12 is a schematic diagram illustrating a manner in which four liquid crystal projectors 200-1 to 200-4 display an image in a task-distributed fashion.

In order to form one original image by displaying partial images using a plurality of liquid crystal projectors, it is required to properly determine the areas displayed by the respective projectors. The processing of displaying spatially divided areas of an image using four liquid crystal projectors is a paradigm of parallel processing. It is convenient to describe a parallel syntax associated with the parallel processing when a primitive presentation file is produced using application software on the processing apparatus 700. Japanese Patent Application Publication No. 6-4498 discloses a method of writing a parallel execution unit in a scope from cobegin to coend and also a method of interpretation thereof, which can be employed in the present invention.

FIGS. 13(A)-(B) are schematic diagrams illustrating a communication method using a virtual machine 500, wherein FIG. 13(A) illustrates a conventional communication method and FIG. 13(B) illustrates a communication method according to the present embodiment.

In the case where a virtual machine 500 is simply installed in each projector 200 to perform dynamic distributed processing, when the application software, that is, the application layer program 12, is produced, great care should be taken to ensure that each liquid crystal projector 200 can deal with the correct drawing area assigned to it.

In general, in order to process an execution unit of a program in parallel, the following two conditions should be met. Firstly, the processing system including the OS which executes the program must have a resource capable of executing threads of the program, that is, capable of executing execution units in parallel. More specifically, there must be as many independent processors as there are parallel processing lines. Secondly, the program to be processed should be described in units of threads executable in parallel, and furthermore the program should be described so that the processing system can detect the threads.

In the present embodiment, "distributed execution" is a wide concept extended from "parallel execution". That is, parallel execution" is a special case of "distributed execution" in which processing units are distributed to a plurality of processing systems and are preferably executed in parallel in terms of time and the results are required to be synchronized at a certain point of time.

In the case where two liquid crystal projectors 200-5 and 200-6 are connected to each other via an IEEE-802.3 bus 192 as shown in FIG. 13(A), a connection between application layer programs 12-5 and 12-6 is established wherein each application layer program cares about the other application layer program. If the liquid crystal projector 200-5, which is a first projector which starts interpretation of primitive presentation data, detects, in a statement of a program, a part which is out of the allowable display range, the liquid crystal projector 200-5 attempts to pass that part to the liquid crystal projector 200-6.

More specifically, the control unit reads the transmission control program of the built-in OS of the liquid crystal projector 200 and establishes a connection to the liquid crystal projector 200-6 via the IEEE-802.3 bus 192. The control unit then transmits, to the liquid crystal projector 200-6, the part in the range to be processed by the liquid crystal projector 200-6.

The application layer program 12-5 is required to sequentially perform connection of the network, opening of the line, and the transmission of the part to be processed, using a service routine of the built-in OS. Similarly, the application layer program 12-6 is required to sequentially perform connection of the network, accepting of the opening of the line, and reception of the part to be processed.

Because a large number of processes such as those described above are required to be performed to use a plurality of liquid crystal projectors, the specifications of the application layer programs 12-5 and 12-6 described in primitive presentation files become complicated. Besides, they have to be rewritten to adapt to each execution environment.

As described above, the application layer program 12 used in this technique is a primitive presentation data produced by another application program for producing presentation data. As described earlier with reference to FIG. 4, the content of the primitive presentation data can be regarded as a set of command words of an intermediate language object to be executed by the virtual machine 500.

In order to achieve simplification in use, the application layer program should be described, on the assumption that it may be executed by means of parallel processing, so as to includes a plurality of parallel-syntax expressions so that the application layer program is executed in parallel when parallel processing is available in the execution environment. Alternatively, when the application layer program is executed, the virtual machine 500 may dynamically and autonomously communicate with another virtual machine to distribute the process.

One technique of describing a plurality of parallel processing syntax expressions in advance according to the former method is to employ the communication scheme between intermediate language interpreters disclosed in Japanese Patent Application Publication No. 6-4498 filed by the present applicant.

Examples of the latter method of dynamically and autonomously communicating with another virtual machine include a method using a JAVA virtual machine and a method based on a multi-agent technique.

By employing such a method, it becomes possible to increase the number of liquid crystal projectors to, for example, 16, 64, or more projectors, without having to rewrite the primitive presentation data.

In the present embodiment, as shown in FIG. 13(B), an IEEE-1394 bus 300 is employed to achieve remote access, among respective nodes, to memory resources.

In the case where the communication method between intermediate language interpreters, disclosed in Japanese Patent Application Publication No. 6-4498 filed by the present applicant, is employed, the master interpreter of the virtual machine 500-1 of the liquid crystal projector 200-1 loads, at a loading stage, an object code described in an intermediate language into the work area of the slave interpreter which is a process executed in a memory space of another liquid crystal projector 200-2. The master interpreter then loads stack initialization data. In accordance with the stack initialization data, the master interpreter stores initial data into a stack and sets a stack pointer.

Subsequently, table initialization data is loaded and a sequence of processes is performed to initialize the contents of a run-time block management table and a common resource management table. The above-described operation may be achieved by means of communication using an RS-232C serial line or may be achieved with the assistance of an upper-layer protocol implemented in a layer equal to or higher than a transport layer such as a network file system as is used in the UNIX OS or the like. However, in order to achieve remote memory access at a practical processing speed, the operation should be achieved using an IEEE-1394 bus transaction.

This makes it possible to produce the application layer programs 12-1 and 12-2 without concern for drawing areas to be dealt with by the respective application layer programs 12-1 and 12-2. In this case, it appears as if a virtual connection were established between the virtual machines 500 at a lower level below the application layer programs 12-1 and 12-2.

The distributed processing according to the present embodiment is described in further detail below for the case where JAVA virtual machines are employed as the virtual machines 500.

Figure 14:
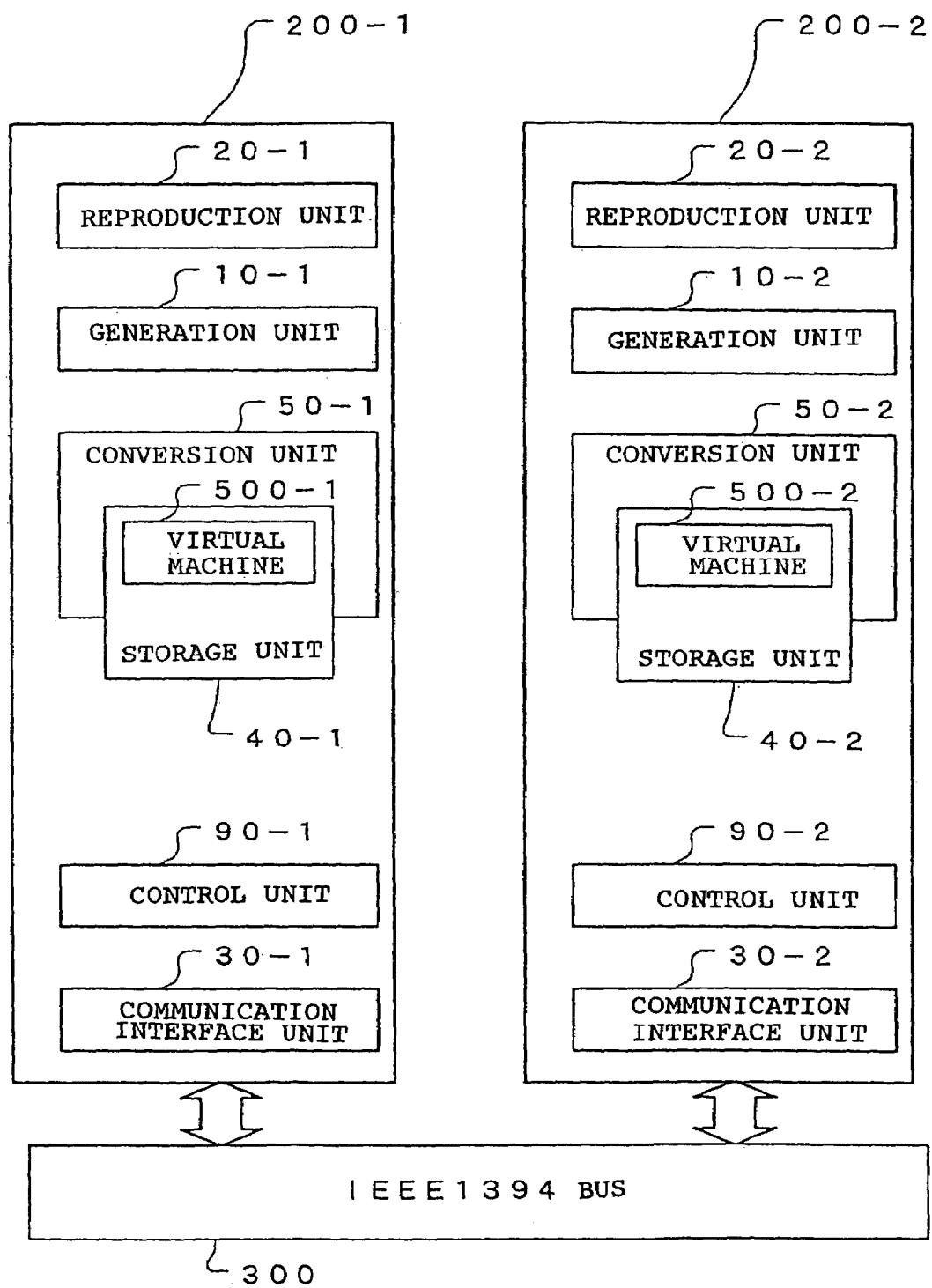
FIG. 14 is a functional block diagram associated with distributed processing according to the present embodiment.

FIG. 14 is a functional block diagram associated with the distributed processing according to the present embodiment.

The liquid crystal projector 200-1 includes a conversion unit 50-1 including a virtual machine 500-1 for converting supplied-data received from another liquid crystal projector 200-2 or the like serving as a data supply apparatus into a data format which allows generation or reproduction, and a communication interface unit 30-1 for receiving, from the input device 400, supplied-data which is convertible by the conversion unit 50-1.

The liquid crystal projector 200-1 also includes a generation unit 10-1 for generating meeting data on the basis of the supplied-data converted by the conversion unit 50-1, a control unit 90-1 for storing the generated meeting data in a storage unit 40-1 in such a manner that the meeting data is managed in predetermined units of data for each of other liquid crystal projectors 200 and for reading meeting data in predetermined units of data associated with each of the respective other liquid crystal projectors 200, and a reproduction unit 20-1 for reproducing the meeting data read.

The storage unit 40-1 also stores the management table 42 and other data used by the control unit 90-1, in addition to the meeting data 44 including presentation data and received supplied-data.

The storage unit 40-1 is accessible by the other liquid crystal projectors 200 via the communication unit 30-1.

The virtual machine 500-1 according to the present embodiment is described below.

FIG. 15 is a functional block diagram illustrating a software part and a hardware part of the projector 200.

The software part includes the generation unit 10 including a voice processing API (Application Programming Interface) and an image processing API, the control unit 90 including a plurality of command words, a dispatcher to the command words, a plurality of device drivers, and a runtime library, and the virtual machine 500.

Herein, instead of the voice processing API or the image processing API, a voice processing class or an image processing class may be employed.

In the present embodiment, the virtual machine 500 refers to means for reading files in a common format and performing operations specified in the files. A specific examples include a JAVA virtual machine and a virtual machine having an interpreter capable of performing parallel processing such as one that is disclosed in Japanese Patent Application Publication No. 6-4498 cited earlier.

The JAVA virtual machine may be implemented in the form of an interpreter or a compiler in the software part or may be implemented with a dedicated CPU in the hardware unit. In the present embodiment, the JAVA virtual machine is implemented in the software unit.

The virtual machine 500 includes a plurality of threads each including one program counter and one stack, and also includes a heap area. The stack and the head area are work areas which also serve as the storage unit 40.

The use of the plurality of threads allows multithread processing. This improves the execution performance and the concurrency of distributed processing.

The hardware part includes a reproduction unit 20 including a display unit, a control unit 90 including a video controller, a storage unit 40 including a video RAM (V-RAM), and a communication interface unit 30 including an IEEE-1394 link layer and an IEEE-1394 physical layer.

A practical example of the displaying process using a plurality of liquid crystal projectors 200-1 and 200-2 is described below.

Herein, it is assumed that the liquid crystal projector 200-1 serves as a master projector and the liquid crystal projector 200-2 serves as a slave projector.

Furthermore, let us assume that the liquid crystal projector 200-1 displays an image 1210-1 in the range of coordinates (0, 0) to coordinates (1020, 768). The drawing information indicating the drawing area is stored in the storage unit 40.

If the second liquid crystal projector 200-2 is connected to the IEEE-1394 bus 300, it becomes possible for the liquid crystal projector 200-1 serving as the master projector and the liquid crystal projector 200-2 to start to transmit and receive supplied-data.

At this stage, the liquid crystal projector 200-2 can recognize that the liquid crystal projector 200-1 is currently in operation. Furthermore, the liquid crystal projector 200-2 checks the drawing information stored in the storage unit 40-1 of the liquid crystal projector 200-1 to detect the drawing area dealt with by the liquid crystal projector 200-1.

After performing the above recognition, the liquid crystal projector 200-2 reads image information, to be displayed by the liquid crystal projector 200-2, from the storage unit 40-1 of the liquid crystal projector 200-1 and converts it using the virtual machine 500 into a data format that can be processed by the liquid crystal projector 200-2. The resultant data is written into the V-RAM area and displayed on the display unit under the control of the video controller.

As described above, the stack area is provided in the storage unit 40 for each thread. Therefore, even when the stack area in a certain thread is being used in multithread processing, the stack area in another thread can be used. Thus, substantially no degradation in concurrency occurs even when the storage unit 40 is shared.

Furthermore, the use of the IEEE-1394 bus 300 and the IEEE-1394 bus interface allows supplied-data to be transmitted and received at a high speed. Therefore, even when the storage unit 40 is shared, the respective projectors 200 can access the storage unit 40 of another liquid crystal projector 200 at a high speed similar to the speed at which the projectors 200 access their own storage units 40.

In some cases, the resolutions of the liquid crystal projectors 200 used in a meeting system are different from each other. For example, a certain liquid crystal projector 200 has a VGA resolution with 640{×}480 dots, another liquid crystal projector 200 has an SVGA resolution with 800{×}600 dots, still another liquid crystal projector 200 has an XGA resolution with 1024{×}768 dots, and so on.

Even in such a case, for example, coordinates (1500, 920) can be displayed, if required to do so, by combining the liquid crystal projectors 200 having different resolutions. For example, when the master liquid crystal projector 200 has a VGA resolution, a 1920{×}1440 display area can be covered by combining a total of nine liquid crystal projectors 200, and thus coordinates (1500, 920) can be displayed.

Even in this case, the slave liquid crystal projector 200 can check the drawing information stored in the storage unit 40 of the master liquid crystal projector 200 and can automatically adjust the resolution according to the drawing information.

Because meeting data can be generated in an efficient fashion by means of distributed processing as described above, even a large size of meeting data which needs a large amount of processing can be generated and reproduced at a comfortable speed. Thus, it is possible to realize a quick-responsive meeting system.

Instead of employing the memory sharing technique, the distribution processing may also be achieved by means of an object delivering technique.

Some methods of realizing meeting systems have been described above. Meeting systems having similar advantages may also be realized using a computer-readable information storage medium.

(Description of Information Storage Medium)

Figure 16:
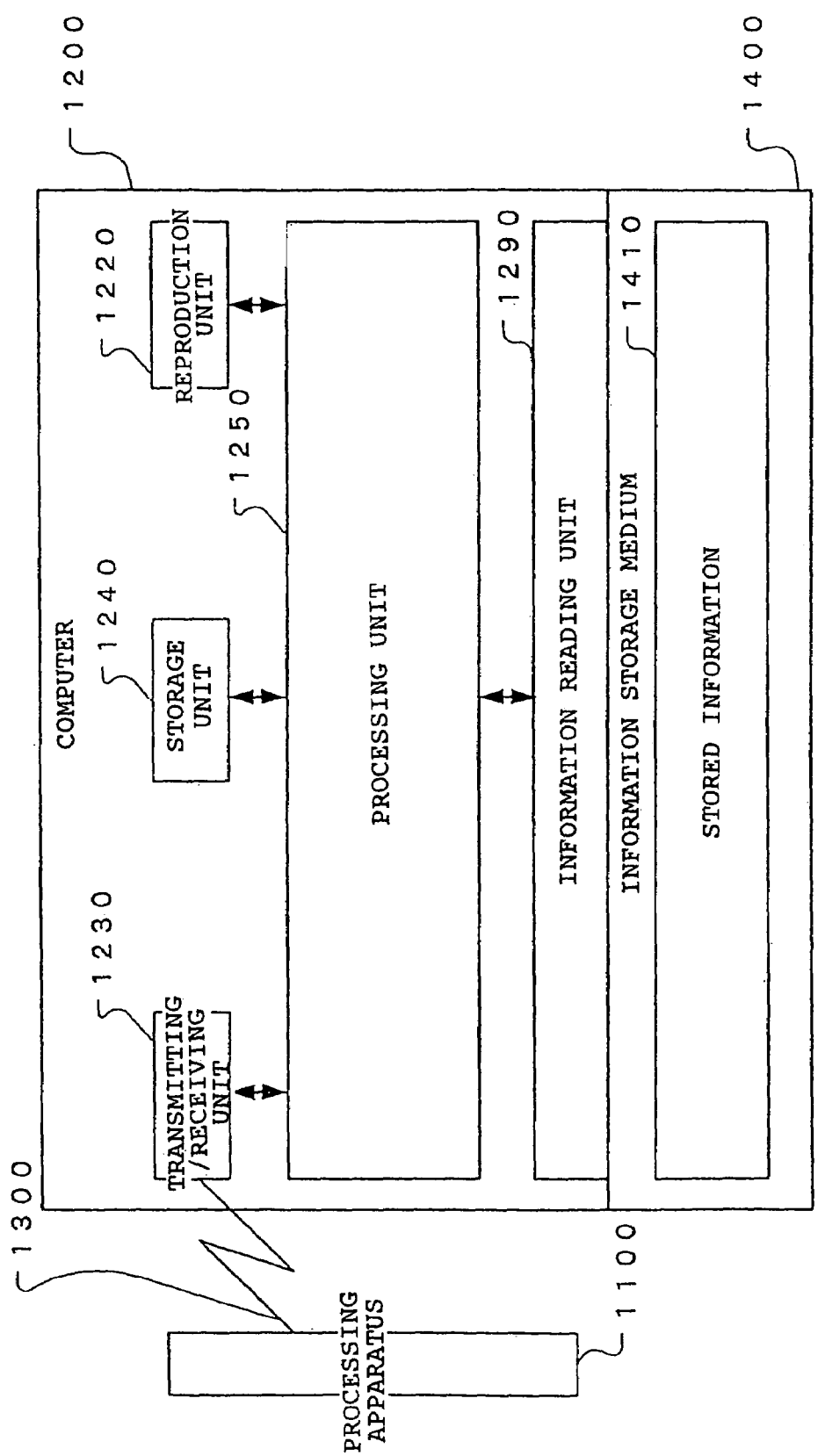
FIG. 16 is a functional block diagram of an example of an information storage medium according to the present embodiment.

FIG. 16 is a functional block diagram of an example of an information storage medium according to the present embodiment.

The information storage medium 1400 includes stored information 1410 readable by a computer 1200, wherein information for realizing various functions described above is stored in the stored information 1410.

The computer 1200 includes a transmitting/receiving unit 1230 for communicating with another processing apparatus 1100 via a communication line 1300, a storage unit 1240 for storing various data, programs, and the like, a processing unit 1250 for performing image processing and the like, a reproduction unit 1220 for reproducing data such as image data, and an information reading unit 1290 for reading information from the information storage medium 1400.

Specific examples of these hardware units are as follows. A communication device or an ATM switch having an IEEE-1394 interface may be employed as the transmitting/ receiving unit 1230, a ROM, RAM, or the like as the storage unit 1240, a display, a monitor, a projector, or the like as the reproduction unit 1220, and a CPU, an image processor, or the like as the processing unit 1250.

Specific examples of the information storage medium 1400 include a medium such as a CDROM, a DVDROM, or the like from which information stored thereon is read using a laser beam, a hard disk from which information stored thereon is read magnetically, and a memory.

Instead of connecting the information storage medium 1400 directly to the information reading unit 1290, the stored information 1410 stored in a server device may be downloaded to the computer 1200 via the communication line 1300.

Specific examples of the communication line 1300 serving as the transmission line include an IEEE-1394 bus and an optical fiber.

In order to realize the journal capability described earlier, the stored information 1410 may be formed to include information for generating meeting data such that supplied-data received from a plurality processing apparatuses 1100 via the communication line 1300 serving as the transmission line is reflected in the meeting data, wherein the information includes presentation information, storing information for storing the supplied-data in the storage unit 1240 such that the supplied-data is managed separately for each processing apparatus 1100, reading information for reading, from the storage unit 1240, meeting data including at least a part of the supplied-data and the presentation information, in accordance with a reproduction command issued by a meeting participant.

This allows meeting participants to immediately play back past meeting data by issuing a command.

Preferably, the reading information includes information for reading, in response to a reproduction command, the meeting data stored in the storage unit 1240 in units of data associated with the respective processing apparatuses 1100.

The use of the reading information makes it possible to determine which supplied-data is received from which processing apparatus 1100.

Furthermore, it also becomes possible to reproduce meeting data such that supplied-data associated with the respective processing apparatuses 1100 is reflected in the meeting data. More specifically, for example, when a plurality of meeting participants are distributing input data using their own input devices, it is possible to play back the meeting data in units of data associated with the respective input devices, that is, in units of data input by the respective meeting participants.

Furthermore, it is also preferable that the stored information 1410 include information for recording images of a meeting scene, the storing information include information for storing the image data as a part of the meeting data into the storage unit 1240 in particular units of data, and the reading information include information for reading, in response to the reproduction command, the meeting data stored in the storage unit 1240 in particular units of data.

This makes it possible to reproduce the recorded images of the meeting scene without delay. Because the image of the object includes not only reproduced presentation data but also the motion of the presenter, it is possible to better understand the situation of the meeting.

It is also desirable that the stored information 1410 include recording information for recording the voice during a meeting, and it is desirable that the storing information indicate that the recording data is stored in the storage means as a part of the meeting data in predetermined units of data.

This makes it possible to reproduce voice data together with other data, and thus it becomes possible to better understand the meeting situation.

Herein, specific examples of the particular units of data are chapters, sections, and pages. For example, if a meeting participant issues a command to request reproduction of Section 2 in Chapter 3, the specified part of the data is immediately played back without delay.

Furthermore, it is preferable that the stored information 1410 include information for reproducing the above information read.

This makes it possible for meeting the participants to immediately check the meeting data read by reproducing the meeting data by means of displaying or projecting the associated image or reproducing the associated voice data.

Furthermore, it is also preferable that the stored information 1410 include information for transmitting the above read information to the processing apparatus 1100.

This makes it possible to reproduce or print the meeting data using the processing apparatus 1100 such as a display device or a printer.

The interconnectivity described above can be improved by forming the stored information 1410 in the manner described below.

For example, the stored information 1410 is formed to include interpretation information for interpreting received supplied-data using the virtual machine 500 and also include generation information for generating the meeting data in accordance with the interpretation result.

Thus, by using the virtual machine 500 which converts the supplied-data described in the common format into a particular format which can be interpreted by the apparatus which receives the supplied-data, it is possible to easily transmit and receive data among the processing apparatus 1100 and the computer 1200. This makes it possible to realize a meeting system capable of flexibly replacing various processing apparatus with other apparatus.

Furthermore, the stored information 1410 may be formed to include information for generating supplied-data which can be interpreted by the virtual machine 500 and also include information for distributing the generated supplied-data.

Thus, by employing the common format for supplied-data thereby generating and distributing supplied-data interpretable by another processing apparatus 1100, it becomes possible for the processing apparatus, which receives the supplied-data, to process the supplied-data without concern about the type or the manufacturer of the apparatus which distributes the supplied-data. This makes it easy to transmit and receive data among the processing apparatuses 1100. Thus, it becomes possible to realize a meeting system capable of flexibly replacing various processing apparatuses 1100 with other apparatuses.

Alternatively, the stored information 1410 may also be formed so as to include presentation data, storing information for storing the interpreted supplied-data including the input data, received from the processing apparatus including a plurality of input means, into the storage means such that the supplied-data is managed separately for each input means, reproduction information for reproducing meeting data including at least a part of the input data and presentation information from the storage means in accordance with a reproduction command.

This allows meeting participants to immediately play back past meeting data by issuing a command.

The storing information preferably includes information for storing the interpreted supplied-data including the input data in the storage unit 1240 such that the supplied-data is managed separately for each processing apparatus 1100, and the reproducing information preferably includes information for reproducing meeting data including at least a part of the input data and presentation information from the storage means in accordance with a reproduction command.

This allows meeting participants to immediately play back past meeting data in units of data associated with the respective processing apparatuses 1100 by issuing a command indicating that the meeting data should be played back in units of data associated with the respective processing apparatus.

More specifically, for example, when a plurality of meeting participants are distributing input data using their own input devices, it is possible to play back the meeting data in units of data associated with the respective input devices, that is, in units of data input by the respective meeting participants.

Furthermore, it is preferable that the stored information 1410 include information for recording images of a meeting scene, that the storing information include information for storing the recorded image data as a part of the meeting data into the storage unit 1240 in particular units of data, and that the reproducing information include information for reproducing, in response to the reproduction command, the meeting data stored in the storage unit 1240 in particular units of data.

This make it possible to reproduce the recorded images of the meeting scene without delay.

The recorded image data includes not only presentation data to be reproduced but also additional information such as that indicating an image pointed to by the presenter. This allows a better understanding of the meeting situation.

Herein, specific examples of the particular units of data are chapters, sections, and pages. For example, if a meeting participant issues a command to request reproduction of Section 2 in Chapter 3, the specified part of the data is immediately played back without delay.

The supplied-data preferably includes at least one of image data, an object for generating an image, an object for controlling the generation of an image, an object for reproducing an image, and an object for controlling the reproduction of an image.

This makes it possible to realize a meeting system in which various data can be efficiently transmitted and received among the processing apparatuses.

It is preferable that the transmission line described above include an IEEE-1394 bus.

This allows supplied-data or the like to be transmitted at a high speed among the processing apparatuses. In particular, when image data is transmitted, it is required to transmit a large amount of data. However, the use of the IEEE-1394 bus makes it possible to easily process the image data in real time.

Structure of the stored information 1410 preferable for achieving improvement in interconnectivity have been described above. Structure of the stored information 1410 preferable for improving the data processing efficiency in the distributed processing is now described below.

For example, the stored information 1410 comprises information for generating meeting data while a plurality of processing apparatuses 1100 interconnected via communication lines 1300 serving as the transmission lines transmit and receive, and perform distributed processing on, supplied-data in a common format interpretable by a virtual machine 500, wherein the information includes information for implementing the communication interface 30 which allows the storage unit 1240 to be shared by other processing apparatuses 1100.

This makes it possible to provide storage medium which is accessible by the respective processing apparatuses 1100. This storage technique is effective in particular for distributed processing.

Herein, the transmission line is preferably an IEEE-1394 bus, and the communication interface unit is preferably an IEEE-1394 bus interface.

This allows the respective processing apparatuses 1100 to access the shared storage unit 1240 as if the access were performed to their own storage areas.

Alternatively, the stored information 1410 comprises information for generating meeting data while a plurality of processing apparatuses 1100 interconnected via communication lines 1300 serving as the transmission lines transmit and receive, and perform distributed processing on, supplied-data in a common format interpretable by a virtual machine 500, wherein the information includes information for generating supplied-data in the common format and information for transmitting the generated supplied-data to at least one of the processing apparatuses 1100 having a storage unit accessible by the respective processing apparatuses 1100.

This technique according to the present invention allows supplied-data generated in a share mode (the common format) to be stored in the storage means in the common form thereby making it possible for the respective processing apparatus to access the storage means to acquire the supplied-data. This technique is effective in particular in distributed processing.

In the case where a JAVA applet is employed as the supplied-data, a plurality of processing apparatus can simultaneously download the JAVA applet stored in the storage means. This makes it possible to easily change the specifications or extend the functions.

Herein, it is preferable to employ an IEEE-1394 bus as the transmission line.

This allows the respective processing apparatus to access the shared storage means as if the access were performed to their own storage areas.

Alternatively, the stored information 1410 comprises information for reproducing meeting data while a plurality of processing apparatuses 1100 interconnected via transmission lines transmit and receive, and perform distributed processing on, supplied data in a common format interpretable by a virtual machine 500, wherein the information includes reading information for accessing at least one of the processing apparatuses 1100 having a storage unit which stores the meeting data and which is accessible by the respective processing apparatuses 1100 to read the meeting data stored in the storage unit, and the information also includes reproducing information for reproducing the image data that has been read.

Herein, the reading information may include information for generating supplied-data indicating a reading request and converting the supplied-data into the common format and information for transmitting the converted supplied-data to the processing apparatus 1100 having the storage means to receive supplied-data including meeting data from the processing apparatus 1100, and the reproducing information may include information for implementing the virtual machine 500 and information for converting supplied-data using the virtual machine 500 in accordance with the received supplied-data so as to reproduce the meeting data.

Herein, the employment of the common format for supplied-data accommodates the differences in OS and manufacturer and makes it possible to receive and display image data regardless of the type of the apparatus which provides the image data.

Alternatively, the stored information 1410 comprises information for generating meeting data while a plurality of processing apparatuses 1100 interconnected via transmission lines transmit and receive, and perform distributed processing on, supplied-data in a common format interpretable by a virtual machine 500, wherein the information includes requesting information for requesting a particular service to other processing apparatuses 1100, and providing information for providing a particular service to other processing apparatuses 1100.

Herein, the requesting information includes information for generating supplied-data indicating a request for the particular service and converting the supplied-data into the common format and information for transmitting the converted supplied-data to other processing apparatuses, and the providing information includes information for implementing the virtual machine 500, information for receiving supplied-data indicating a request for a service from other processing apparatuses and converting the supplied-data using the virtual machine 500, information for determining whether it is possible to provide the service in accordance with the converted supplied-data, and information for, if it is possible to provide the service, providing the service.

This allows image processing to be performed by a plurality of processing apparatuses in a task-distributed fashion while transmitting and receiving information to or from one another. For example, when a projector issues a request for a printing service, a printer available for providing the printing service responds to the request and provides the printing service.

Such distributed processing can be achieved by facilitating the transmission and reception of data among the processing apparatuses by employing the virtual machine and the common format for supplied-data.

The supplied-data preferably includes at least one of meeting data, an object for generating meeting data, an object for controlling the generation of meeting data, an object for reproducing meeting data, and an object for controlling the reproduction of meeting data.

Herein, because the data or objects are described in the same common format, high versatility can be obtained in image processing by means of distributed processing.

It is preferable that the transmission line described above include an IEEE-1394 bus.

This allows the respective processing apparatuses 1100 to access the shared storage means as if the access were performed to their own storage areas. Furthermore, the respective processing apparatuses are allowed to perform the above-described transmission and reception of information at a high speed, and thus the processing speed is increased.

(Modifications)

The present invention is not limited to the embodiments descried above, and various modifications are possible.

For example, although the IEEE-1394 bus 300 is employed as the transmission line in the examples described above, various types of high-speed transmission line may also be employed. Specific examples of such high-speed transmission lines include a fiber channel and a satellite communication channel.

Furthermore, although in the embodiments described above, the distributed processing is performed using two meeting data reproducing apparatuses (liquid crystal projectors 200), distributed processing may also be performed using two meeting data generating apparatuses or using a meeting data generating apparatus and a meeting data reproducing apparatus. Such a technique also falls within the scope of the present invention.

As for data used in presentations, addition of secondary information such as sampled voice data, character codes obtained as a result of voice recognition, and character codes obtained by means of handwritten character recognition via a digitizing device such as a tablet, is important. For such recognition processing, a DSP (Digital Signal Processor) having high signal processing performance may be employed to achieve a high processing speed. As can be seen from the embodiments described above, the distributed processing according to the present invention is based on communication among virtual machine interpreters and on autonomous distribution of processing.

In the conventional techniques, in order to use a DSP, application software (application layer program) needs to generate machine codes specific to the DSP, and the resultant machine codes are supplied to the DSP system and executed thereby. In contrast, in the present invention, a virtual machine interpreter can be implemented on a DSP system connected via an IEEE-1394 bus, and the DSP system can be incorporated into the distributed processing. In this technique, the resource of the DSP with high calculation performance can be used without having to rewrite application layer programs or primitive presentation files.

Furthermore, the program language used to realize the present invention is not limited to the JAVA language. There are many languages which can generate machine codes which can be executed by virtual machines so as to use the processor resources in a multiplex fashion at the machine language level. In such languages, drawing commands can be described in a similar manner to those set forth. The present invention can be carried out using various languages without having a dependence upon the specifications, in terms of syntax and lexical analysis, of high-level languages used to generate drawing command words.

INDUSTRIAL APPLICABILITY

The present invention may be applied to meeting systems in which various devices are interconnected.

The invention claimed is:

1. A meeting system in which supplied-data convertible using a virtual machine is transmitted and received among a plurality of processing apparatuses interconnected via a transmission line, and in which meeting data is reproduced, at least two of said plurality of processing apparatuses comprising a meeting data reproducing apparatus respectively, each meeting data reproducing apparatus reproducing meeting data that includes fixed presentation data and supplied-data, and the presentation data including at least one pointer indicating an address of the supplied-data so that a portion of the meeting data may be reproduced by specifying at least one of a particular presenter, a meeting participant or time;

at least one meeting data reproducing apparatus comprising:

a conversion unit including a virtual machine that receives the supplied-data from another one of the plurality of processing apparatuses, reads files in a common format and performs operations specified in the files, the virtual machine converting said supplied-data into a data format which allows said meeting data to be reproduced, the meeting data being stored in units based on corresponding units of the supplied-data, each unit of the meeting data being identifiable by a specific processing apparatus that supplied a corresponding unit of the supplied-data;

a communication interface unit that receives said supplied-data from another processing apparatus; and a storage unit in which a generated image is stored and which is accessible by said another processing apparatus via said communication interface unit, and each of said at least one meeting data reproducing apparatus and said another meeting data reproducing apparatus including said conversion unit and said communication interface unit reading a part of said meeting data from said storage unit and reproducing meeting data in a task-distributed fashion.

2. The meeting system according to claim 1,
at least two processing apparatuses being associated with at least two respective meeting participants, and
each of the at least two processing apparatuses identifying a corresponding one of the at least two respective meeting participants.

3. The meeting system according to claim 1,
the generated image being generated based on the meeting data, and
each of the at least one meeting data reproducing apparatus and the another meeting data reproducing apparatus simultaneously displaying different parts of the generated image on different sub-areas of a display area.

4. The meeting system according to claim 1, the virtual machine being a JAVA virtual machine.

5. The meeting system according to claim 1, the supplied-data including time data.

6. A meeting system in which supplied-data convertible using a virtual machine is transmitted and received among a plurality of processing apparatuses interconnected via a transmission line, and in which meeting data is generated, at least two of said plurality of processing apparatuses comprising a meeting data generating apparatus respectively, each meeting data generating apparatus generating meeting data that includes fixed presentation data and supplied-data, and the presentation data including at least one pointer indicating an address of the supplied-data so that a portion of the meeting data may be reproduced by specifying at least one of a particular presenter, a meeting participant or time:

at least one meeting data generating apparatus comprising:

a conversion unit including a virtual machine that receives the supplied-data from another one of the plurality of processing apparatuses, reads files in a common format and performs operations specified in the files, the virtual machine converting said supplied-data into a data format which allows said meeting data to be generated, the meeting data being stored in units based on corresponding units of the supplied-data, each unit of the meeting data being identifiable by a specific processing apparatus that supplied a corresponding unit of the supplied-data;

a communication interface unit that receives said supplied-data convertible by said convertion unit means from another processing apparatus; and a storage unit that stores generated meeting data, which is accessible by the other processing apparatus via said communication interface unit, and each of said at least one meeting data generating apparatus and the other meeting data generating apparatus including said conversion unit and said communication interface unit accessing said storage unit and generating meeting data in a task-distributed fashion.

7. The meeting system according to claim 6, the virtual machine being a JAVA virtual machine.

8. The meeting system according to claim 6, the supplied-data including time data.

9. A meeting system in which supplied-data convertible using a virtual machine is transmitted and received among a plurality of processing apparatuses interconnected via a transmission line, and in which meeting data is generated and reproduced, at least one of said plurality of processing apparatuses comprising a meeting data generating apparatus, at least one of said plurality of processing apparatuses comprising a meeting data reproducing apparatus, each meeting data reproducing apparatus reproducing meeting data that includes fixed presentation data and supplied-data, and the presentation data including at least one pointer indicating an address of the supplied-data so that a portion of the meeting data may be reproduced by specifying at least one of a particular presenter, a meeting participant or time;

said meeting data reproducing apparatus comprising:

a conversion unit including a virtual machine that receives the supplied-data from another one of the plurality of processing apparatuses, reads files in a common format and performs operations specified in the files, the virtual machine converting said supplied-data into a data format which allows said meeting data to be reproduced, the meeting data being stored in units based on corresponding units of the supplied-data, each unit of the meeting data being identifiable by a specific processing apparatus that supplied a corresponding unit of the supplied-data; and a communication interface unit that receives said supplied-data, which is convertible by said conversion unit, from another processing apparatus;

said meeting data generating apparatus comprising:

a supplied-data generation unit that generates supplied-data, which is convertible by said conversion unit, in accordance with generated meeting data; and a communication interface unit that transmits supplied-data including generated meeting data to said meeting data reproducing apparatus via said transmission line, at least one of said meeting data generating apparatus and said meeting data reproducing apparatus comprising a storage unit that stores generated meeting data, which is accessible by another processing apparatus via said communication interface unit, and said meeting data generating apparatus and said meeting data reproducing apparatus accessing said storage unit and generating and reproducing meeting data.

10. The meeting system according to claim 9,
said supplied-data comprising at least one of image data for displaying said meeting data and control data for controlling the displaying of said meeting data,
said meeting data reproducing apparatus comprising:
a display unit that displays said meeting data in accordance with said image data; and
a control unit that controls the displaying of said meeting data in accordance with said control data.

11. The meeting system according to claim 9,
said processing apparatus comprising a server device,
said supplied-data comprising a component object serving as a part of a program for generating said meeting data, and
said meeting data generating apparatus generating said program for generating meeting data in accordance with the received component object and generating said meeting data using said program.

12. The meeting system according to claim 9,
said meeting data generating apparatus comprising data control unit that stores the supplied-data, converted by said conversion unit, in said storage unit in which particular presentation data is stored while said supplied-data is managed in units of supplied-data received from each of said processing apparatuses, and
reads meeting data including at least a part of said supplied-data and said presentation data from said storage unit in accordance with a reproduction command from each of said processing apparatuses, and
said communication interface unit comprising a transmitting unit that transmits the read meeting data to said meeting data reproducing apparatus.

13. The meeting system according to claim 12,
said meeting data reproducing apparatus reproducing said meeting data stored in said storage unit in units of data associated with said processing apparatus which supplies said supplied-data, in accordance with said reproduction command.

14. The meeting system according to claim 13,
said meeting data generating apparatus comprising:
an image-recording unit that records images of a meeting scene, and
an image data unit that stores image data obtained as a result of the recording of images of the meeting scene in said storage unit as a part of said meeting data, in predetermined units of data, and
said meeting data reproducing apparatus reproducing said meeting data stored in said storage unit, in predetermined units of data in accordance with said reproduction command.

15. The meeting system according to claim 14,
at least one of said meeting data generating apparatus and said meeting data reproducing apparatus comprising a projector.

16. The meeting system according to claim 9, the virtual machine being a JAVA virtual machine.

17. An information storage medium readable by a computer including a storage unit and that stores information for generating meeting data while a plurality of processing apparatuses interconnected via a transmission line transmit and receive, and perform distributed processing on, supplied data in a common format interpretable by a virtual machine, the meeting data being stored in units based on corresponding units of the supplied-data, each unit of the meeting data being identifiable by a specific processing apparatus that supplied a corresponding unit of the supplied-data, said information comprising:
information for implementing a communication interface unit which allows said storage unit to be shared by other processing apparatuses via the transmission line;
information for reproducing meeting data by a meeting data reproducing apparatus of each of the plurality of processing apparatuses, each of the meeting data information including fixed presentation data and supplied-data, and the presentation data including at least one pointer indicating an address of the supplied-data so that a portion of the meeting data may be reproduced by specifying at least one of a particular presenter, a meeting participant or time; and
information for implementing said virtual machine to receive the supplied-data from another one of the plurality of processing apparatuses, read files in the common format, perform operations specified in the files, and convert said supplied-data into a data format which allows said meeting data to be reproduced.

18. The meeting system according to claim 17, the virtual machine being a JAVA virtual machine.

19. An information storage medium which is readable by a computer and which stores information for generating meeting data while a plurality of processing apparatuses interconnected via a transmission line transmit and receive, and perform distributed processing on, supplied data in a common format interpretable by a virtual machine, the meeting data being stored in units based on corresponding units of the supplied-data, each unit of the meeting data being identifiable by a specific processing apparatus that supplied a corresponding unit of the supplied-data, said information comprising:
information for generating supplied-data in said common format;
information for transmitting said generated supplied-data to at least one of said processing apparatuses having storage unit accessible by the respective processing apparatuses via the transmission line;
information for reproducing meeting data by a meeting data reproducing apparatus of each of the plurality of processing apparatuses, each of the meeting data information including fixed presentation data and supplied-data, and the presentation data including at least one pointer indicating an address of the supplied-data so that a portion of the meeting data may be reproduced by specifying at least one of a particular presenter, a meeting participant or time; and
information for implementing the virtual machine to receive the supplied-data from another one of the plurality of processing apparatuses, read files in the common format, perform operations specified in the files, and convert said supplied-data into a data format which allows said meeting data to be reproduced.

20. An information storage medium which is readable by a computer and which stores information for reproducing meeting data while a plurality of processing apparatuses interconnected via a transmission line transmit and receive, and perform distributed processing on, supplied-data in a common format interpretable by a virtual machine,
said information comprising:
reading information for accessing at least one of said processing apparatuses having a storage unit which stores said meeting data and which is accessible by the respective processing apparatuses to read said meeting data stored in said storage unit, the meeting data being stored in units based on corresponding units of the supplied-data, each unit of the meeting data being identifiable by a specific processing apparatus that supplied a corresponding unit of the supplied-data; and
reproducing information for reproducing read image data,
said reading information comprising:
information for generating supplied-data indicating a reading request and for converting said supplied-data into said common format; and information for transmitting said converted supplied-data via the transmission line to a processing apparatus having said storage unit to receive supplied-data including meeting data from said processing apparatus, said reproducing information comprising:

information for reproducing meeting data by a meeting data reproducing apparatus of each of the plurality of processing apparatuses, each of the meeting data information including fixed presentation data and supplied-data, and the presentation data including at least one pointer indicating an address of the supplied-data so that a portion of the meeting data may be reproduced by specifying at least one of a particular presenter, a meeting participant or time;

information for implementing said virtual machine to receive the supplied-data from another one of the plurality of processing apparatuses, read files in the common format and perform operations specified in the files; convert said supplied-data including said meeting data to be reproduced; and information for converting supplied-data, using said virtual machine in accordance with the received supplied-data, into a data format so as to reproduce the meeting data.

21. An information storage medium which is readable by a computer and which stores information for generating meeting data while a plurality of processing apparatuses interconnected via a transmission line transmit and receive, and perform distributed processing on, supplied-data in a common format interpretable by a virtual machine, the meeting data being stored in units based on corresponding units of the supplied-data, each unit of the meeting data being identifiable by a specific processing apparatus that supplied a corresponding unit of the supplied-data, said information comprising:

requesting information for requesting a particular service to another processing apparatus;

providing information for providing a particular service to another processing apparatus, said requesting information comprising:

information for generating supplied-data indicating a request for said particular service and converting said supplied-data into said common format; and information for transmitting said converted supplied-data to another processing apparatus via the transmission line, said providing information comprising:

information for reproducing meeting data by a meeting data reproducing apparatus of each of the plurality of processing apparatuses, each of the meeting data information including fixed presentation data and supplied-data, and the presentation data including at least one pointer indicating an address of the supplied data so that a meeting scene may be reproduced by specifying at least one of a particular presenter, a meeting participant or time;

information for implementing said virtual machine to receive the supplied data from another one of the plurality of processing apparatuses, read files in the common format and perform operations specified in the files; convert said supplied-data including said meeting data to be reproduced;

information for receiving supplied-data indicating a request for a service from another processing apparatus and converting, using said virtual machine, said supplied-data into a data format which allows said meeting data to be reproduced;

information for determining whether it is possible to provide said service in accordance with said converted supplied-data; and information for, if it is possible to provide said service, providing said service.

22. The information storage medium according to claim 21, said supplied-data comprising at least one of meeting data, an object for generating meeting data, an object for controlling the generation of meeting data, an object for reproducing meeting data, and an object for controlling the reproduction of meeting data.

* * * * *